United States Patent [19]

Shinohara

[11] Patent Number: 5,444,822
[45] Date of Patent: Aug. 22, 1995

[54] SEMICONDUCTOR INTEGRATED CIRCUIT DEVICE CARRYING OUT PARALLEL OPERATIONAL PROCESSING WITH ELECTRONICALLY IMPLEMENTED NEURAL NETWORK

[75] Inventor: Hirofumi Shinohara, Hyogo, Japan

[73] Assignee: Mitsubishi Denki Kabushiki Kaisha, Tokyo, Japan

[21] Appl. No.: 77,143

[22] Filed: Jun. 16, 1993

[30] Foreign Application Priority Data

Jul. 28, 1992 [JP] Japan .................................. 4-201467

[51] Int. Cl.$^6$ .............................................. G06F 15/18
[52] U.S. Cl. ...................................... 395/27; 395/21; 395/24
[58] Field of Search ............................. 395/27, 21, 24

[56] References Cited

U.S. PATENT DOCUMENTS 4,994,982  2/1991  Duranton et al. ..................... 395/27
5,115,492  5/1992  Engeler ................................ 395/27

OTHER PUBLICATIONS

The Lneuron Chip: A Digital VLSI with on Chip Learning Mechanism J. B. Theeten et al. Jul. 09, 1990 Int. Conf. on N N A 576-neuron wafer-scale CMOS circuit solves the 16 city traveling salesman problem in less than a tenth of a second.
M. Griffin, et al., "An 11-Million Transistor Neural Network Execution Engine", IEEE International Solid-State Circuits Conference (1991), pp. 180–181 and 313.
International Joint Conference of Neural Networks, 1990, II, pp. 527–535 and 537–544 (cited on p. 5 of specification).

Primary Examiner—Allen R. MacDonald
Assistant Examiner—Richemond Dorvil
Attorney, Agent, or Firm—Lowe, Price, LeBlanc & Becker

[57] ABSTRACT

A semiconductor integrated circuit device electrically simulating a vital neural network includes neuron units. Each neuron unit includes a plurality of laterally connected synapse units, an accumulator for accumulatively adding the outputs of the final synapse unit in the lateral connection, and a nonlinear processor for carrying out a predetermined nonlinear operational processing on the output of the accumulator. The number of the neuron units and the number of synapse units per neuron unit satisfy a relation of an integer multiple. The number of regularly operating neuron units can be made equal to that of the synapse units per neuron unit, whereby it is possible to prevent the neuron units from performing meaningless operations and an efficient neural network can be obtained.

15 Claims, 25 Drawing Sheets

FIG. 2(a)
9-00

| Addr | |
|---|---|
| 0 | wb0a0 |
| 1 | wb0a2 |
| ... | ... |
| 6 | wb6a0 |
| 7 | wb6a2 |
| 8 | wc0b0 |
| ... | ... |
| 11 | wc0b6 |

FIG. 2(b)
9-10

| | Addr |
|---|---|
| wb1a0 | 0 |
| wb1a2 | 1 |
| ... | ... |
| wb7a0 | 6 |
| wb7a2 | 7 |
| wc1b0 | 8 |
| ... | ... |
| wc1b6 | 11 |

ADDRESS ↓

FIG. 2(c)
9-01

| Addr | |
|---|---|
| 0 | wb0a1 |
| 1 | wb0a3 |
| ... | ... |
| 6 | wb6a1 |
| 7 | wb6a3 |
| 8 | wc0b1 |
| ... | ... |
| 11 | wc0b7 |

FIG. 2(d)
9-11

| | Addr |
|---|---|
| wb1a1 | 0 |
| wb1a3 | 1 |
| ... | ... |
| wb7a1 | 6 |
| wb7a3 | 7 |
| wc1b1 | 8 |
| ... | ... |
| wc1b7 | 11 |

ADDRESS ↓

TO ACC 3

TO ACC 3

TO ACC 3

$$\frac{\#NEURON}{\#SYNAPSE} = \frac{M}{N} = K$$

SEMICONDUCTOR INTEGRATED CIRCUIT DEVICE CARRYING OUT PARALLEL OPERATIONAL PROCESSING WITH ELECTRONICALLY IMPLEMENTED NEURAL NETWORK

BACKGROUND OF THE INVENTION

1. Field of the Invention

The present invention relates to a parallel processing semiconductor integrated circuit device having a parallel operational function and a system employing the same, and more particularly, it relates to an integrated circuit device which can simulate a neural network and a system employing the same.

2. Description of the Background Art

There have been proposed various computational techniques which are modelled on vital nerve cells (neurons). In a data processing technique which is modelled on neurons, employed is a neural network including a plurality of neurons. In such data processing employing a neural network, data are asynchronously and parallelly processed among respective neurons upon supply of input data. Upon supply of a certain input data, the neural network generates such output data that the energy of the overall neural network system takes the minimum value. A computational technique employing such a neural network, which requires no algorithm for solving problems, is well-suited to solution of non-algorithmic problems such as pattern recognition and associative storage.

FIG. 28 illustrates a general neuron model. Referring to FIG. 28, a neuron unit Yj is coupled with four neuron units Y0, Y1, Y2 and Y3. This neuron unit Yj includes a synapse coupling parts SY0, SY1, SY2 and SY3 which receive output signals y0, y1, y2 and y3 from the neuron units Y0, Y1, Y2 and Y3 respectively, a conversion part CV which receives outputs from the synapse coupling parts SY0 to SY3 to carry out prescribed operational processing, and an output part OT which receives an output from the conversion part CV and carries out further conversion for generating an output signal yj.

The synapse coupling parts SY0 to SY4 have prescribed weights (synapse loads) with respect to the neuron units Y0 to Y3 respectively. Namely, the respective synapse coupling parts SY0 to SY3 weight the output signals y0, y1, y2 and y3 with weighing factors Wj0, Wj1, Wj2 and Wj3 respectively, to transmit the weighted signals to the conversion part CV. For example, the output signal y0 from the neuron unit Y0 is converted to a signal Wj0.y0 by the synapse coupling part SY0, to be then transmitted to the conversion part CV. The synapse loads Wj0 to Wj3 of the synapse coupling parts SY0 to SY3 indicate coupling strength levels between the neuron units Y0 to Y3 and the neuron unit Yj respectively. These loads Wj0 to Wj3 take positive values in the case of excitatory coupling, while the same take negative values in the case of inhibitory coupling.

The conversion part CV takes the sum of the signals received from the synapse coupling parts SY0 to SY3. The output part OT determines whether or not the sum received from the conversion part CV satisfies a certain condition. When the certain condition is satisfied, the output part OT fires to transmit the signal yj to an output signal line. As to correspondence to a vital brain cell, the synapse coupling parts SY of this neuron unit model correspond to dendrites and synapses, the conversion part CV and the output part OT correspond to a nerve cell body, and the output signal line corresponds to an axon.

In an electronic model, the signals y0 to y3 are expressed in numerical values within a range of 0 to 1 respectively. The neuron units are in firing states when such values are 1 or approximate to 1, while the former are in non-firing states when the latter are zero or approximate to zero. Each neuron unit updates its state (value of its output signal) in accordance with the input. The sum uj obtained by the conversion part CV is defined as follows:

$$uj = \Sigma Wji.yi + Wjj$$

The summation is carried out in relation to the subscript i. Wjj corresponds to the threshold value of the neuron unit Yj. This value is generally set at zero, as shown in FIG. 28.

The output part OT decides its state in accordance with the sum uj. When the sum uj is in excess of a certain threshold value, the neuron unit Yj fires and its output yj reaches 1 or a value approximate to 1. When the sum uj is below the threshold value, on the other hand, the neuron unit Yj enters a non-firing state and the output signal yj reaches zero or a value approximate to zero. In order to decide this state, the output part OT executes the following operation:

$$yj = f(uj)$$

A monotonously increasing nonlinear conversion function is employed for the function f(uj) which is applied to the conversion from the sum uj to the output signal yj. As to such a monotonously increasing nonlinear conversion function, well known is a sigmoid function as shown in FIG. 29, which is expressed as follows:

$$yj = 1/(1 + \exp(-A(uj - B)))$$

where B represents a threshold value and A represents a value showing the width of a transient region. When the threshold value A is increased, the width of the transient region is reduced so that the function approaches a step function. Referring to FIG. 29, the axis of abscissas shows the sum uj and the axis of ordinates shows the output signal yj.

In general, a neuron is rarely independently employed. A neural network is implemented by mutually or hierarchically coupling two or more neuron units. Various proposals have been made as to a semiconductor integrated circuit (hereinafter simply referred to as a neurochip) which can express such a neural network.

FIG. 30 shows the structure of a conventional neurochip. The neurochip shown in FIG. 30 is structured on the basis of a technique which is described in IJCNN (International Joint Conference of Neural Networks), 1990, II, pp. 527 to 535 and 537 to 544, for example.

Referring to FIG. 30, the neurochip includes four neuron units 6a0, 6a1, 6a2 and 6a3. Each of the neuron units 6a0 to 6a3 includes a weight memory 1 for holding a synapse load value (value indicating strength of synapse coupling), a digital multiplier (MPY) 2 for multiplying a neuron state value received through a data bus 7 by the output value of the weight memory 1, an accumulator (ACC) 3 provided with a reset function for cumulatively adding up outputs from the multiplier 2, a nonlinear processor 4 for nonlinearly converting an output of the accumulator 3, and a bus driver 5 which is activated in response to one of control signals EN0 to EN3 to transmit an output of the nonlinear processor 4 to the data bus 7. The control signals EN0 to EN3 drive the respective bus drivers 5 of the neuron units 6a0 to 6a3. Therefore, the output of the nonlinear processor 4 is transmitted to the data bus 7 from one of the neuron units 6a0 to 6a3 at a time. The neuron units 6a0 to 6a3 are integrated on a single semiconductor chip, and a 4-bit address A<3;0> is supplied in common to the weight memories 1 of the neuron units 6a0 to 6a3. Further, a reset signal RESET is supplied in common to the accumulators 3 of the respective neuron units 6a0 to 6a3. The data bus 7 is coupled to eight data input/output pins D<7;0>.

In the structure shown in FIG. 30, each weight memory 1 has a structure of 16 words by 8 bits, while each multiplier 2 is a signed integer multiplier for carrying out multiplication of 8 by 8 bits and rounding the output to 12 bits. The output of each accumulator 3 is expanded in digit to 16 bits. Each nonlinear processor 4 compresses the 16-bit signal received from the accumulator 3 to 8 bits, in correspondence to the bus width of the data bus 7. The operation of the neurochip shown in FIG. 30 is now described upon simulation of a neural network shown in FIG. 31.

Referring to FIG. 31, the neural network has a three-layer structure of an input layer, an intermediate layer and an output layer. The input layer includes four neurons Ya0, Ya1, Ya2 and Ya3. The intermediate layer includes eight neurons Yb0, Yb1, Yb2, Yb3, Yb4, Yb5, Yb6 and Yb7. The output layer includes two neurons Yc0 and Yc1.

This neural network has a feed forward connection structure, so that signals are transmitted from the input layer to the output layer through the intermediate layer 32 (4 by 8) synapse couples in the intermediate layer and 16 (8 by 2) synapse couples in the output layer, or 48 synapse couples in total are provided. The operation is executed along the following order. In the following description, the reset signal RESET and the control signals EN0 to EN3 are in inactive states of logic "0" unless otherwisely stated.

(1) The reset signal RESET is generated in the form of a one-shot pulse (entering a state of "1" for a prescribed period), to reset contents of the accumulators 3 to zero in the neuron units 6a0 to 6a3.

(2) The data pins D<7;0> are supplied with a value ya0 expressing the state of the input neuron Ya0 in an 8-digit signed binary number.

(3) Address pins A<3;0> are supplied with an address (i=0) in parallel with the aforementioned input of the state signal. The weight memories 1 of the neuron units 6ak (k=0 to 3) output synapse load values Wbjai (j=k=0 to 3, i=0) respectively. Namely, synapse load values Wb0a0, Wb1a0, Wb2a0 and Wb3a0 are outputted.

(4) In the respective neuron units 6a0 to 6a3, the multipliers 2 calculate the products Wbjai.yai (j=0 to 3, i=0) of the outputs Wbjai of the weight memories 1 and yai.

(5) In the respective neuron units 6a0 to 6a3, the accumulators 3 add the results of multiplication received from the multipliers 3 to the holding values (in reset states of zero) thereof, and hold the results.

Coupling between each of the neurons Yb0 to Yb3 and the neuron Ya0 is expressed by the aforementioned operations.

(6) The aforementioned operations (2) to (4) are further repeated three times (four times in total). The number i is incremented one by one every repetition as 1, 2, 3. The address supplied to the address input terminals A<3;0> is also incremented one by one in a similar manner.

As the result, the accumulators 3 of the neuron units 6a0 to 6a3 hold the following values:

$$\rho Wbjai.yai = ubj$$

The summation is carried out for i=0 to 3, and j=0 to 3, where j represents the intermediate layer neuron units.

(7) In the respective neuron units 6a0 to 6a3, the nonlinear processors 4 nonlinearly convert the values ubj which are held in the accumulators 3. Thus, states ybj (=f(ubj)) of neurons Ybj are obtained, where j=0 to 3.

(8) The control signals EN0, EN1, EN2 and EN2 are sequentially driven to "1", for enabling the bus drivers 5 of the neuron units 6a0 to 6a3 in this order. The states ybj of the neuron units are transmitted onto the data bus 7 in the order of yb0, yb1, yb2 and yb3. The state signals ybj on the data bus 7 are stored in a memory device (not shown) provided in the exterior of the chip through the data input/output pins D<7;0>.

The processing for the intermediate layer neurons Yb0 to Yb3 shown in FIG. 31 is completed by the aforementioned operations. Processing for the remaining intermediate layer neurons Yb4 to Yb7 is executed similarly to the above, as follows:

(9) The aforementioned operations (1) to (8) are repeated with replacement of j=k=0 to 3 by j=k+4=4, 5, 6, 7. Thus, all output states of the intermediate layer neurons Yb0 to Yb7 are obtained. Processing as to the output neurons Yc0 and Yc1 is now described.

(10) A one-shot pulse of logic "1" is applied to the reset pin RESET, to reset the contents held in the accumulators 3 of the neuron units 6a0 to 6a3 to zero.

(11) The data input/output pins D<7;0> are supplied with states ybi (i=0) of the intermediate layer neurons Ybi (i=0) from an external memory device (not shown).

(12) The address input pins A<3;0> are supplied with an address i+8 (i=0) in parallel with the above operation (11). The weight memories 1 of the neuron units 6ak (k=0 and 1) output synapse coupling values Wcjbi (j=k=0, 1, i=0) respectively. Namely, synapse load values Wc0b0 and Wc1b1 are outputted.

(13) In the neuron units 6a0 and 6a1, the multipliers 2 calculate the products Wcjbi.ybi (j=k=0, 1, i=0) of the synapse load values Wcjbi received from the weight memories 1 and the neuron state values ybi. Thus, values of coupling between the neurons Yc0 and Yc1 and the intermediate layer neuron Yb0 are obtained.

(14) In the neuron units 6a0 and 6a1, the accumulators 3 add the results of multiplication received from the multipliers 2 in the aforementioned operation (13) to the holding values thereof, and hold the results of such addition as new holding values.

(15) The aforementioned operations (11), (12) and (13) are further repeated seven times (eight times in total). The number i is incremented one by one every repetition as 1, 2, 3, 4, 5, 6, 7. Thus, the accumulators 3 of the neuron units 6a0 and 6a1 hold the following values:

$$pWcjbi.ybi = ucj; j = k = 1,1$$

Thus, the sum of the inputs from the intermediate layer neurons Yb0 to Yb7 is obtained in each of the output layer neurons Yc0 and Yc1 shown in FIG. 31.

(16) In the neuron units 6a0 and 6a1, the nonlinear processors 4 nonlinearly convert the holding values ucj of the accumulators 3 to obtain states ycj (=f(ucj)) of the neurons Ycj, where j=k=0, 1.

The operation of the neural network shown in FIG. 31 is completed by the aforementioned operations. In order to utilize the as-obtained results, it is necessary to transmit the results of calculation to a host calculator or the like which is provided in the exterior of the neurochip. In this transmission, the following operation (17) is executed:

(17) Signals of logic "1" are successively applied to control input pins Enk (k=0, 1). Thus, the state data ycj (j=k=0, 1) are transmitted to an external device such as the host calculator from the bus drivers 5 of the neuron units 6a0 and 6a1 through the data bus 7 and the data input/output pins D<7;0>.

During the aforementioned operations (10) to (16), the neuron units 6a2 and 6a3 carry out meaningless operations with no regard to the final outputs. Such neuron units carrying out meaningless operations are hereinafter referred to as idling neuron units.

In the aforementioned conventional neurochip, a plurality of neuron units operate in parallel with each other so that a plurality of operational processes can be executed in parallel. However, a single neuron unit can execute calculation of only single synapse coupling such as that between the neurons Yb0 and Ya0, for example, at a time, and hence it is impossible to execute processing at a high speed.

Further, communication between the neurochip and the exterior as to data such as neuron states can be executed only through a set of data bus and data input-/output pins. Thus, the data transmission speed bottlenecks high-speed execution of the operational processing.

In addition, an idling neuron unit is caused when the number of subsequent stage neuron units receiving output states of common precedent stage neuron units is smaller than that of neuron units provided on the neurochip. When the number of neuron units provided on the neurochip is increased, therefore, it is difficult to reduce the processing time.

In order to increase the degree of parallelism of the neurochip, further, it is necessary to connect this neurochip in parallel. Therefore, internal loops of the respective processes, i.e., the respective neuron units, must be provided with the same numbers of not only multipliers and adders but also nonlinear processors which are rather infrequently used, leading to increase of the chip size.

SUMMARY OF THE INVENTION

An object of the present invention is to provide a parallel operational semiconductor integrated circuit device which can execute operational processing at a high speed, and a system employing the same.

Another object of the present invention is to provide a parallel operational semiconductor integrated circuit device which can remarkably improve the degree of parallelism of operational processing with small increase in number of elements, and a system employing the same.

Still another object of the present invention is to provide a parallel operational semiconductor integrated circuit device which can expand data bandwidths between neuron units in a neurochip and between the neurochip and the exterior, and a system employing the same.

A further object of the present invention is to provide a parallel operational semiconductor integrated circuit device which can suppress generation of an idling neuron unit, and a system employing the same.

A further object of the present invention is to provide a parallel operational semiconductor integrated circuit device which can efficiently simulate a neural network.

The parallel operational semiconductor integrated circuit device according to the present invention includes a plurality of cascade-connected synapse expressing units and a cell body expressing unit which is provided in correspondence to an output of the final stage of the synapse expressing units in a single neuron unit. The circuit device further comprises a path for transmitting outputs of respective neuron units, i.e., state signals, to the synapse expressing units. Due to this structure, it is possible to improve the degree of parallelism of processing only through addition of the synapse expressing units.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2(a)–2(d) illustrate contents stored in weight memories shown in FIG. 1;

DESCRIPTION OF THE PREFERRED EMBODIMENTS

First Embodiment

Figure 1:
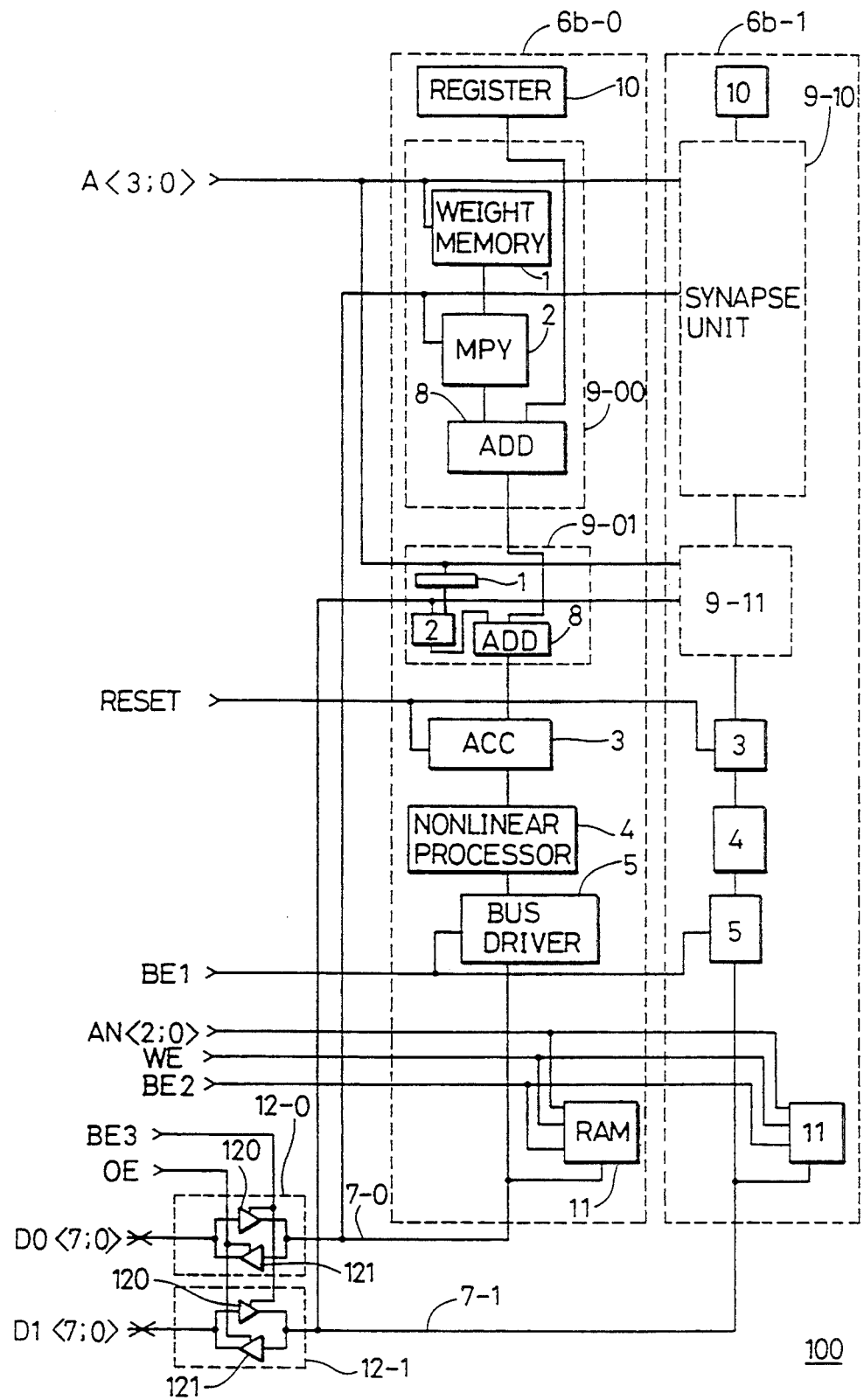
FIG. 1 illustrates an overall structure of a parallel operational semiconductor integrated circuit device according to a first embodiment of the present invention.

FIG. 1 is a block diagram showing an overall structure of a parallel operational semiconductor integrated circuit device 100 according to a first embodiment of the present invention. Referring to FIG. 1, the parallel operational semiconductor integrated circuit device (hereinafter simply referred to as a neurochip) 100 is formed on a single semiconductor chip, and includes two neuron units 6b-0 and 6b-1 which are arranged in parallel with each other. These neuron units 6b-0 and 6b-1 are identical in structure to each other.

The neuron unit 6b-0 includes a register 10 which stores a predetermined constant data, a synapse unit 9-00 which serves as a processing unit for carrying out a prescribed synapse coupling operation, another synapse unit 9-01 which is cascade-connected with the synapse unit 9-00, an accumulator (ACC) which accumulates the output of the synapse unit 9-01, a nonlinear processor 4 which carries out prescribed nonlinear conversion on the output of the accumulator 3, a bus driver 5 which transmits the output of the nonlinear processor 4 onto an internal data bus 7-0 in response to a control signal BE1, and a memory 11, such as a random access memory (RAM) which is capable of reading and writing, for storing intermediate result data such as neuron state data in a neural network simulating operation.

The register 10, which stores a threshold value (Wji) of a neuron expressed by this neuron unit 6b-0, generally stores zero. Another initial value may alternatively be employed in place of zero.

The synapse units 9-00 and 9-01 have the same structures, to express synapse coupling. The synapse unit 9-00 includes a weight memory 1 for storing a weight indicating the strength of synapse coupling, a digital multiplier (MPY) 2 for digitally multiplying a synapse load value received from the weight memory 1 by supplied data (neuron state signal), and a digital adder (ADD) 8 for digitally adding the result of multiplication received from the multiplier 2 and data received from the register 10.

Similarly to the synapse unit 9-00, the synapse unit 9-01 includes a weight memory 1, a digital multiplier 2 and a digital adder 8. The digital adder 8 of the synapse unit 9-01 receives the output of the digital adder 8 of the synapse unit 9-00 at its first input, while receiving the output of the corresponding digital adder 2 at its second input. Namely, the register 10 and the synapse units 9-00 and 9-01 are laterally connected with each other.

Where three or more synapse units are provided, such a lateral connection is expanded. Namely, the output of a digital adder 8 which is included in a precedent stage synapse unit is connected to the first input of a digital adder 8 which is included in a subsequent stage synapse unit. Due to such a lateral connection, it is possible to easily increase the number of the synapse units.

The other neuron unit 6b-1 also includes a register 10, synapse units 9-10 and 9-11, an accumulator 3, a nonlinear processor 4, a bus driver 5 and a memory 11. The register 10 and the synapse units 9-10 and 9-11 are laterally connected with each other.

The weight memories 1 of the synapse units 9-00, 901, 9-10 and 9-11 are supplied with an address signal A<3;0> through an address input node A<3;0>. In the following description, a signal input/output node (or pin terminal) and a signal supplied thereto are denoted by the same symbol.

The accumulators 3 of the neuron units 6b-0 and 6b-1 are supplied with a reset signal RESET in common through a reset node RESET. Similarly, the bus drivers 5 of the neuron units 6b-0 and 6b-1 are supplied with a control signal BE1 in common through an enable node BE1. When the control signal BE1 has logic "1", the bus drivers 5 are activated to transmit the outputs of the corresponding nonlinear processors 4 to the data buses 7-0 and 7-1. The data bus 7-0 receives output data of the neuron unit 6b-0, while the data bus 7-1 receives output data of the nonlinear processor 4 of the neuron unit 6b-1.

The memories 11 of the neuron units 6b-0 and 6b-1 are supplied with a 3-bit address signal AN<2;0> in common through an address input node AN<2;0>, as well as a write control signal WE and an output control signal BE2 through nodes WE and BE2.

Bus interface circuits 12-0 and 12-1 including input/output buffers are provided for the data buses 7-0 and 7-1 respectively. Each of the bus interface circuits 12-0 and 12-1 includes tri-state input buffer circuits 120 and 121 which are activated in response to an input command signal BE3 and an output control signal OE supplied through nodes BE3 and OE respectively. The internal data buses 7-0 and 7-1 have an 8-bit width to input and output data from and to the exterior through data input/output nodes D0<7;0> and D1<7;0> via the bus interface circuits 12-0 and 12-1, respectively. Operations of the neurochip shown in FIG. 1 are now described.

Figure 31:
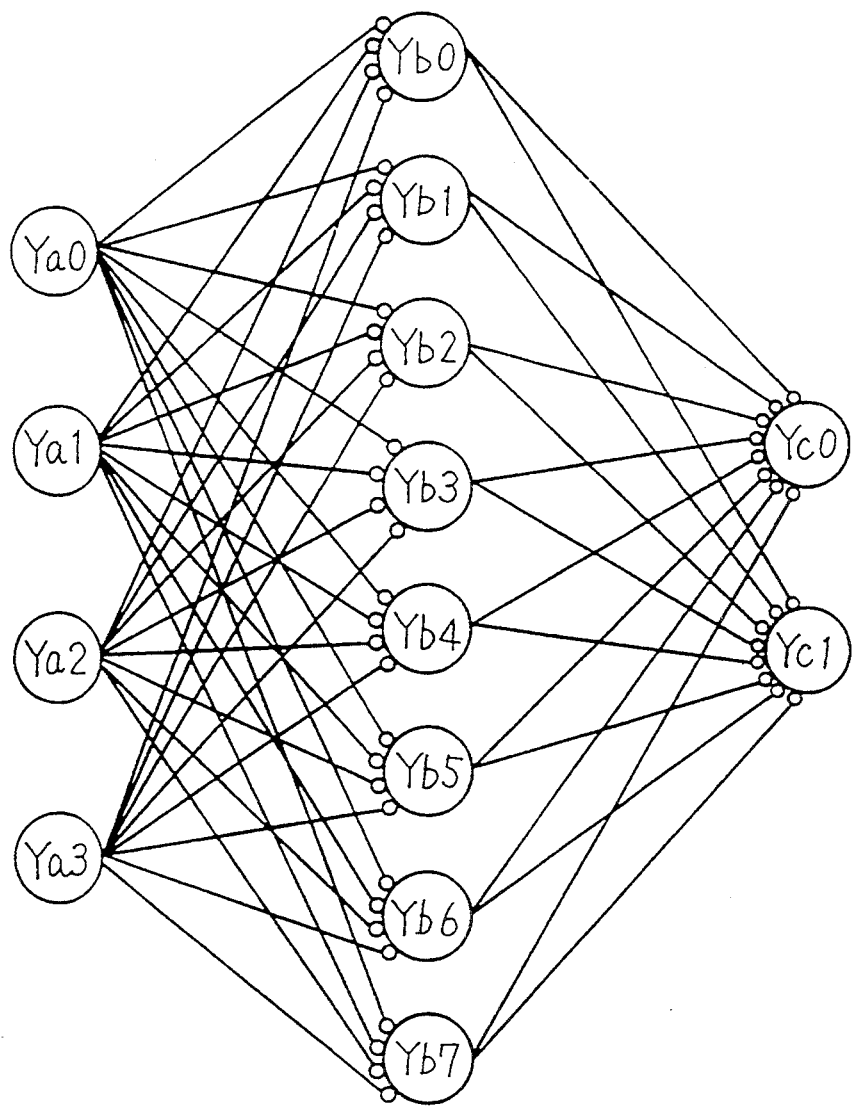
FIG. 31 illustrates an exemplary structure of a neural network.

First, an operation of the neurochip shown in FIG. 1 for simulating the neural network shown in FIG. 31 is described. Subscripts employed in the following description indicate the following numbers:

k: number of neuron unit 6b provided in neurochip, k=0 or 1 in the structure shown in FIG. 1
l: number of synapse unit 9 provided in neuron unit, l=0 or 1 in the structure shown in FIG. 1
i: number of precedent stage neuron; i=2n+1
j: number of noted neuron; j=2m+k
n, m: numbers expressing repetition starting from zero FIGS. 2(a)–2(d) show lists of storage contents in the weight memories 1 included in the synapse units 9-00, 9-01, 9-10 and 9-11. Referring to FIGS. 2, the storage contents of the weight memories 1 in the synapse units 9-00, 9-01, 910 and 9-11 are shown at (a), (b), (c) and (d) respectively. Each weight memory 1 stores synapse load values showing connection strength levels between neurons of an intermediate layer and those of an input layer in the region of addresses zero to 7, while storing synapse load values showing connection strength levels between neurons of an output layer and those of the intermediate layer in the region of addresses 8 to 11.

The weight memory 1 of the synapse unit 9-00 stores synapse load values between even neurons of the input and intermediate layers as well as-those indicating coupling strength levels between even neurons of the intermediate layer and even (i.e., 0) neurons of the output layer. The weight memory 1 of the synapse unit 9-10 stores synapse load values between even neurons of the input layer and odd neurons of the intermediate layer as well as those between even neurons of the intermediate layer and odd (i.e., 1) neurons of the output layer.

The weight memory 1 of the synapse unit 9-01 stores synapse load values between odd neurons of the input layer and even neurons of the intermediate layer as well as those between odd neurons of the intermediate layer and even neurons of the output layer. The weight memory 1 of the synapse unit 9-11 stores synapse loads between odd neurons of the input and intermediate layers as well as those between odd neurons of the intermediate and output layers. The operations will now be described more specifically.

(1) A one-shot pulse of logic "1" is applied to the reset node RESET, to reset the holding values in the accumulators 3 of the neuron units 6b-0 and 6b-1 to zero.

(2) The control node BE3 is supplied with a pulse signal of logic "1", while the data input/output nodes D0<7;0> and D1<7;0> are supplied with binary data yai expressing states of input layer neurons Yai (i=2n+1, n=0), i.e., state signals ya0 and ya1 respectively, since n=0 in this case. The binary numbers ya0 and ya1 are supplied to the internal data buses 7-0 and 7-1 through the bus interface circuits 12-0 and 12-1.

Figure 3:
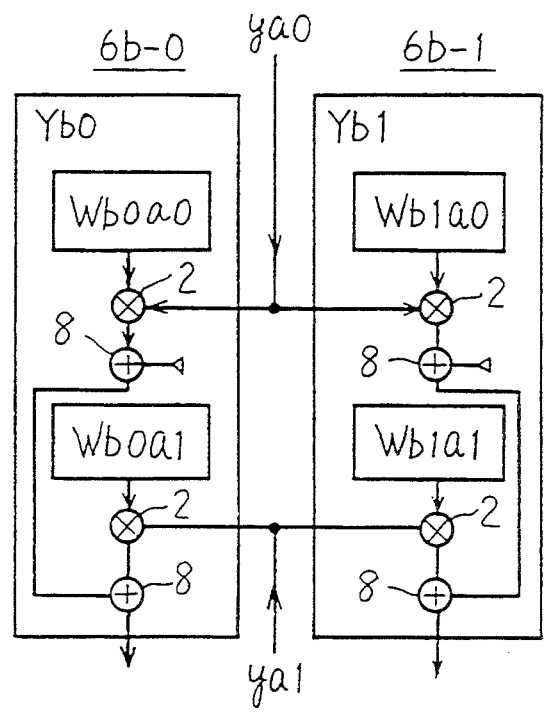
FIG. 3 illustrates an operation of the parallel operational semiconductor integrated circuit device shown in FIG. 1.

(3) An address 2m+n is applied to the address input node A<3;0> in parallel with the operation (2). In this case, n=0 and m=0. Therefore, the weight memories 1 of the synapse units 9-kl (k=0 or 1, l=0 or 1) output synapse load values Wbjai (j=2m+k, i=2n+1, m=0, n=0) respectively. FIG. 3 shows this state. The subscript indicates the number of an operation cycle repeated in state decision of a set of intermediate layer neurons, and the subscript indicates the number of an operation cycle repeated for deciding states of the respective sets of neurons.

As shown in FIG. 3, synapse load values Wb0a0 and Wb0a1 are read from the weight memories 1 of the synapse units 9-00 and 9-01 in the neuron unit 6b-0 respectively. On the other hand, synapse load values Wb1a0 and Wb1a1 are read from the weight memories 1 of the synapse units 9-10 and 9-11 in the neuron unit 6b-1 respectively.

The internal data bus 7-0 is coupled to inputs of the multipliers 2 of the synapse units 9-00 and 9-10, while the internal data bus 7-1 is coupled to inputs of the multipliers 2 of the synapse units 9-01 and 9-11 respectively. As shown in FIG. 3, therefore, the upper multipliers 2 of the neuron units 6b-0 and 6b-1 are supplied with the state signal ya0 of an input layer neuron Ya0, while the lower multipliers 2 are supplied with the state signal ya1 of an input layer neuron Ya1.

In this state, the neuron units 6b-0 and 6b-1 express intermediate neurons Yb0 and Yb1 respectively, as shown in FIG. 3.

(4) In the respective neuron units 6b-0 and 6b-1, the multipliers 2 calculate the products of the received synapse load values Wbjai and the neuron state values yai.

(5) In the respective neuron units 6b-0 and 6b-1, the laterally connected adders 8 successively add initial values stored in the registers 10 and output values of the multipliers 2. Assuming that the registers 10 store initial values of 0, the adders 8 of the synapse units 9-01 and 9-11 corresponding to the final stages respectively output the following values:

$$\Sigma Wb2ma_i \cdot ya_i \text{ and } \Sigma Wb(2m+1)a_i \cdot ya_i$$

where n=0 and m=0.

(6) The accumulators 3 of the respective neuron units 6b-0 and 6b-1 add the results of addition in the final stages obtained in the aforementioned operation (5) to the holding values (0 in initial states) thereof, and hold the added values as new holding values.

Figure 4:
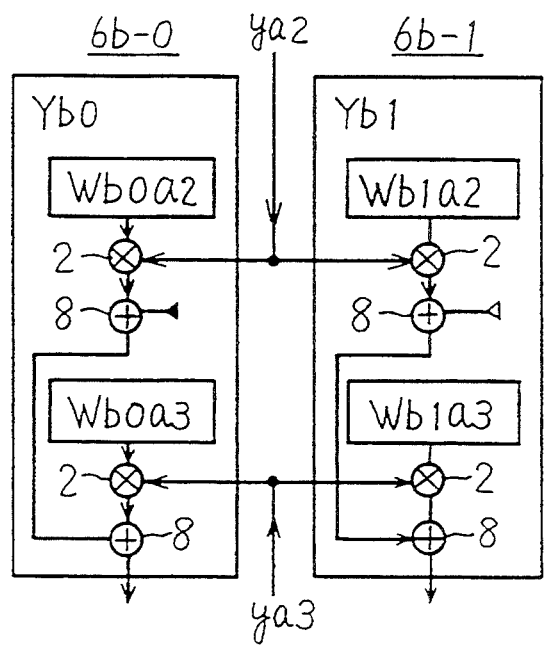
FIG. 4 illustrates another operation of the parallel operational semiconductor integrated circuit device shown in FIG. 1.

(7) The aforementioned operations (2) to (6) are repeated with n=1 (incremented by 1) and m=0 (maintained). In this state, the weight memories 1 output Wb0a2 and Wb0a3 in the neuron unit 6b-0, as shown in FIG. 4. In the neuron unit 6b-1, on the other hand, the weight memories 1 output synapse load values Wb1a2 and Wb1a3. The upper multipliers 2 of the neuron units 6b-0 and 6b-1 are supplied with the state value ya2 of the input layer neuron Ya2, while the lower accumulators 2 are supplied with a state value ya3 of an input layer neuron Ya3. As the result of this operation, the accumulators 3 of the neuron units 6b-0 and 6b-1 respectively hold the following values:

$$\tau Wb(2m)ai.yi = ub(2m)$$

$$\Sigma(2m+1)ai.yi = ub(2m+1)$$

where the summation Z is carried out in a range of i=0 to 3.

Due to this operation, sums of the synapse load values in the intermediate neurons Yb0 and Yb1 are obtained respectively.

(8) In the respective neuron units 6b-0 and 6b-1, the nonlinear processors 4 execute nonlinear conversion on the holding values ubj of the accumulators 3, to obtain state values ybj (=f(ubj)) of the intermediate layer neurons Ybj, where j=2m+k, m=0, and k=0 and 1. Namely, the state values of the intermediate layer neurons Yb0 and Yb1 are obtained.

(9) A pulse of logic "1" is applied to the control node BE1 to activate the bus drivers 5, thereby transmitting outputs of the nonlinear processors 4 in the neuron units 6b-0 and 6b-1 onto the internal data buses 7-0 and 7-1. The address input node AN<2;0> is supplied with an address (m=0) in parallel with this operation, while a signal of logic "1" is applied to the control node WE1 to bring the memories 11 into writing states, thereby writing the data of the internal data buses 7-0 and 7-1 in the memories 11.

Figure 5A:
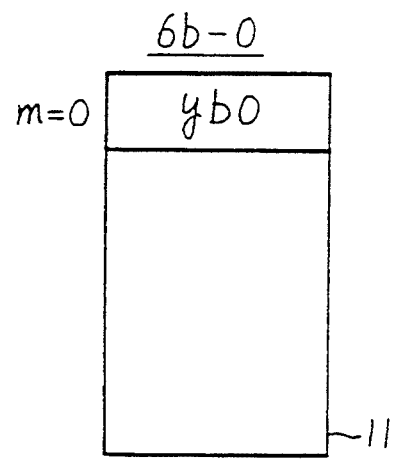
FIGS. 5(a) and 5(b) illustrate contents stored in data memories in an operation of the parallel operational semiconductor integrated circuit device shown in FIG. 1.
Figure 5B:
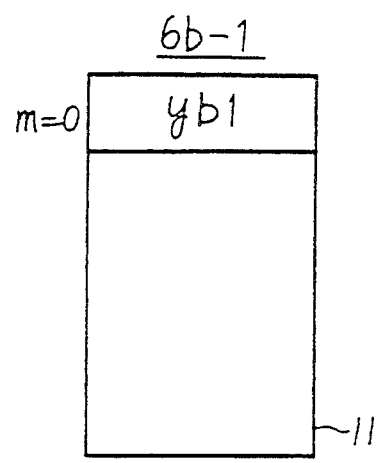

Thus, the memories 11 of the neuron units 6b-0 and 6b-1 store the state values yb0 and yb1 of the intermediate layer neurons Yb0 and Yb1 in addresses 0 (=m) respectively, as shown in FIGS. 5(a) and 5(b).

Processing for the intermediate layer neurons Yb0 and Yb1 is completed by the aforementioned series of operations.

Figure 6A:
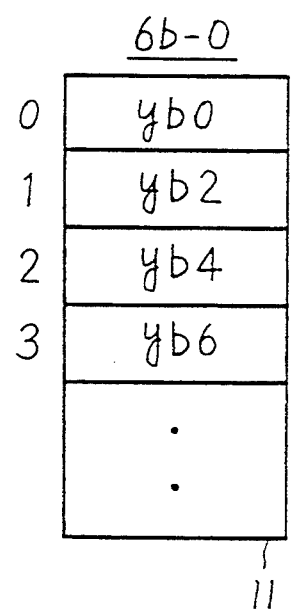
FIGS. 6(a) and 6(b) illustrate contents stored in the data memories in another operation of the parallel operational semiconductor integrated circuit device shown in FIG. 1.
Figure 6B:
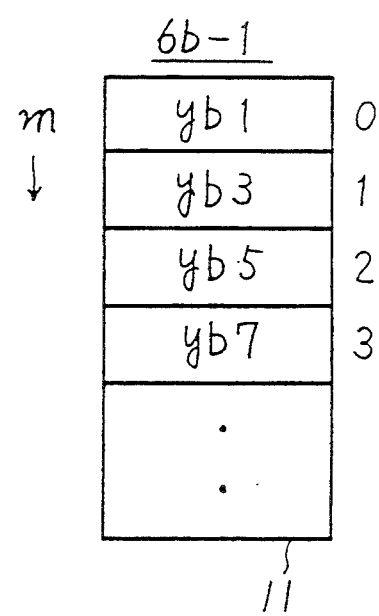

(10) the aforementioned operations (1) to (9) are repeated three times (four times in total) while incrementing m one by one, i.e., with m=1, 2 and 3. Thus, processing for the intermediate layer neurons Yb0 to Yb7 is completed. In this state, the state values of the intermediate layer neurons are stored in the memories 11 of the neuron units 6b-0 and 6b-1, as shown in FIGS. 6(a) and 6(b). Namely, the state values yb0, yb2, yb4 and yb6 are stored in addresses 0, 1, 2 and 3 of the memory 11 in the neuron unit 6b-0, while the state values yb1, yb3, yb5 and yb7 are stored in addresses 0, 1, 2 and 3 of the memory 11 in the neuron unit 6b-1 respectively.

Processing for the output layer neurons Yc0 and Yc1 is now described.

(11) A one-shot pulse signal of logic "1" is applied to the reset node RESET, to reset the holding values of the accumulators 3 in the neuron units 6b-0 and 6b-1 to zero respectively.

(12) The address input node AN<2;0> is supplied with n (n=0), while a signal of logic "1" is applied to the control node BE2. Thus, the state values ybi (i=2n+1, 1=0 and 1) of the intermediate layer neurons being held in the address (n=0) of the memories 11 are outputted onto the data buses 7-0 and 7-1 respectively. Namely, the state value yb0 of the intermediate layer neuron Yb0 is transmitted onto the internal data bus 7-0 from the memory 11 of the neuron unit 6b-0. On the other hand, the state value yb1 of the intermediate neuron Yb1 is read from the memory 11 of the neuron unit 6b-1, to be transmitted onto the internal data bus 7-1.

Figure 7:
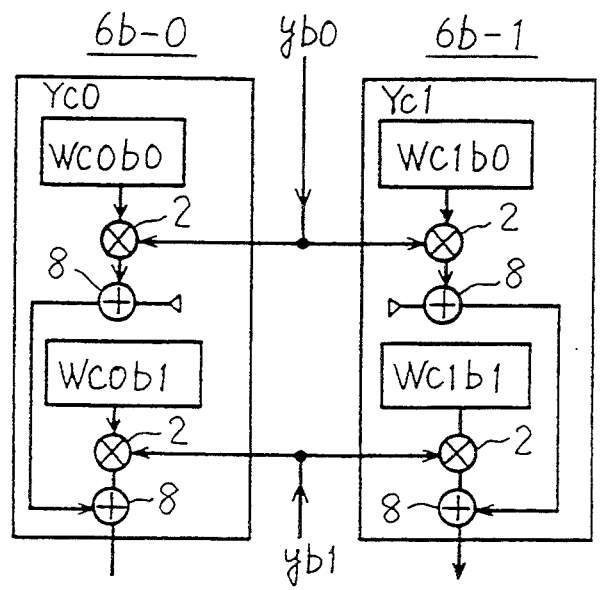
FIG. 7 illustrates a further operation of the parallel operational semiconductor integrated circuit device shown in FIG. 1.

(13) The address input node A<3;0> is supplied with an address 8+n (n=0) in parallel with the operation (12). Thus, the weight memories 1 of the synapse units 9-k1 output synapse load values Wcjbi (j=k=0, 1; i=2n+1, n=0, 1=0, 1) respectively. Namely, the synapse units 9-00, 9-10, 9-01 and 9-11 output synapse load values Wc0b0, Wc1b0, Wc0b1 and Wc1b1 respectively. FIG. 7 shows this state.

In this state, the neuron unit 6b-0 expresses the output layer neuron Yc0 while the neuron unit 6b-1 expresses the output layer neuron Yc1 respectively, as shown in FIG. 7. The upper multipliers 2 of the neuron units 6b-0 and 6b-1 are supplied with the state value yb0 of the intermediate layer neuron Yb0, while the lower multipliers 2 are supplied with the state value yb1 of the intermediate layer neuron Yb1.

(14) In the neuron units 6b-0 and 6b-1, the multipliers 2 each calculate the product of the supplied synapse load value Wcjbi and the supplied intermediate layer neuron state value ybi.

(15) In the neuron units 6b-0 and 6b-1, the laterally connected adders 8 add the output values of the corresponding multipliers 2 to the data held in the registers 10. The registers 10 store threshold values of the corresponding neurons. Assuming that the storage values are zero, the adders 8 in the synapse units 9-10 and 9-11 of the final stages in the neuron units 6b-0 and 6b-1 respectively output the following values:

$$\Sigma Wc0bi.ybi$$

$$\Sigma Wc1bi.ybi$$

where the summation Z is carried out as to i=0 to 2n and 0 to 2n+1 respectively. In this case, n=0.

(16) In the respective neuron units 6b-0 and 6b-1, the accumulators 3 add the results of addition received from the adders 8 of the final stages obtained in the operation (15) to the holding values (reset values of 0) thereof, and hold the results as new holding values.

(17) The aforementioned operations (12) to (16) are repeated three times (four times in total) while incrementing one by one, i.e., with n=1, 2 and 3.

Figure 8:
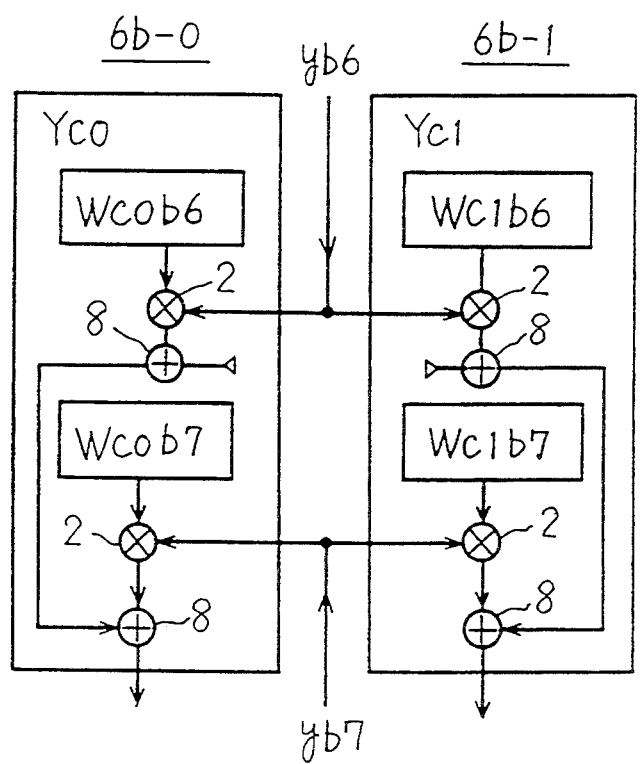
FIG. 8 illustrates a further operation of the parallel operational semiconductor integrated circuit shown in FIG. 1.

FIG. 8 illustrates distribution of data in the neuron units 6b-0 and 6b-1 with n=3. In the final operation cycle, the state values yb6 and yb7 of the intermediate layer neurons Yb6 and Yb7 are supplied to the upper and lower multipliers 2 of the neuron units 6b-0 and 6b-1 respectively.

After completion of this operation cycle, the accumulators 3 of the neuron units 6b-0 and 6b-1 respectively hold the following values:

$$\Sigma Wc0bi.ybi = uc0$$

$$\Sigma Wc1bi.ybi = uc1$$

where the summation E is carried out as to i=0 to 7.

(18) In the respective neuron units 6b-0 and 6b-1, the nonlinear processors 4 execute nonlinear conversion on the holding values ucj of the accumulators 3. Thus, states ycj (=f(ucj)) (j=k=0, 1) of output neurons Ycj are obtained. Namely, the state value yc0 of the output layer neuron Yc0 is outputted from the nonlinear processor 4 of the neuron unit 6b-0, while the state value yc1 of the output layer neuron Yc1 is outputted from the nonlinear processor 4 of the neuron unit 6b-1.

Thus, the operation of the neural network shown in FIG. 31 is completed. In order to utilize the results, it is necessary to transfer the data to a processor such as a host calculator, for example, which is provided in the exterior of the neurochip 100. In this case, the following operation (19) is executed.

(19) Signals of logic "1" are applied to the control node BE1 and the output enable node OE. Thus, the bus drivers 5 in the neuron units 6b-0 and 6b-1 are activated and the tri-state output buffers 121 in the bus interface circuits 12-0 and 12-1 are also activated. The state values yc0 and yc1 of the output layer neurons Yc0 and Yc1 generated by the nonlinear processors 4 of the neuron units 6b-0 and 6b-1 are transferred to a central processing unit (CPU) of the host calculator provided in the exterior or its external memory through the internal data buses 7-0 and 7-1, the bus interface circuits 12-0 and 12-1 and the data input/output nodes D0<7;0> and D1<7;0> respectively.

In order to utilize the results generated by the neuron units 6b-0 and 6b-1 in this neurochip 100 again, the following operation (20) is executed.

(20) A signal of logic "1", an address 4 and a signal of logic "1" are supplied to the control node BE1, the address input node AN<2;0> and the write enable node WE respectively. The memories 11 enter writable states so that the state values yc0 and yc1 supplied onto the internal data buses 7-0 and 7-1 through the bus drivers 5 are written in the address 4 of the memories 11 of the neuron units 6b-0 and 6b-1 respectively.

Second Embodiment

Synapse load values are optimumly set depending on application of a neural network. In order to output a prescribed data in response to an input data, "learning" is made on the neural network, to correct the synapse load values. Models performing such "learning" includes a learning model employing educator data and that employing no educator data. A back propagation model, a Boltzmann machine model and the like are examples of the learning model employing educator data, while an example of the learning model employing no educator data is an LVQ (learning vector quantization) method. In such learning employing no educator data, synapse load values are automatically corrected according to properties of input data with no supply of educator data, so that pattern classification of the input data is executed. A neural network employing such an LVQ method is now briefly described.

Figure 9:
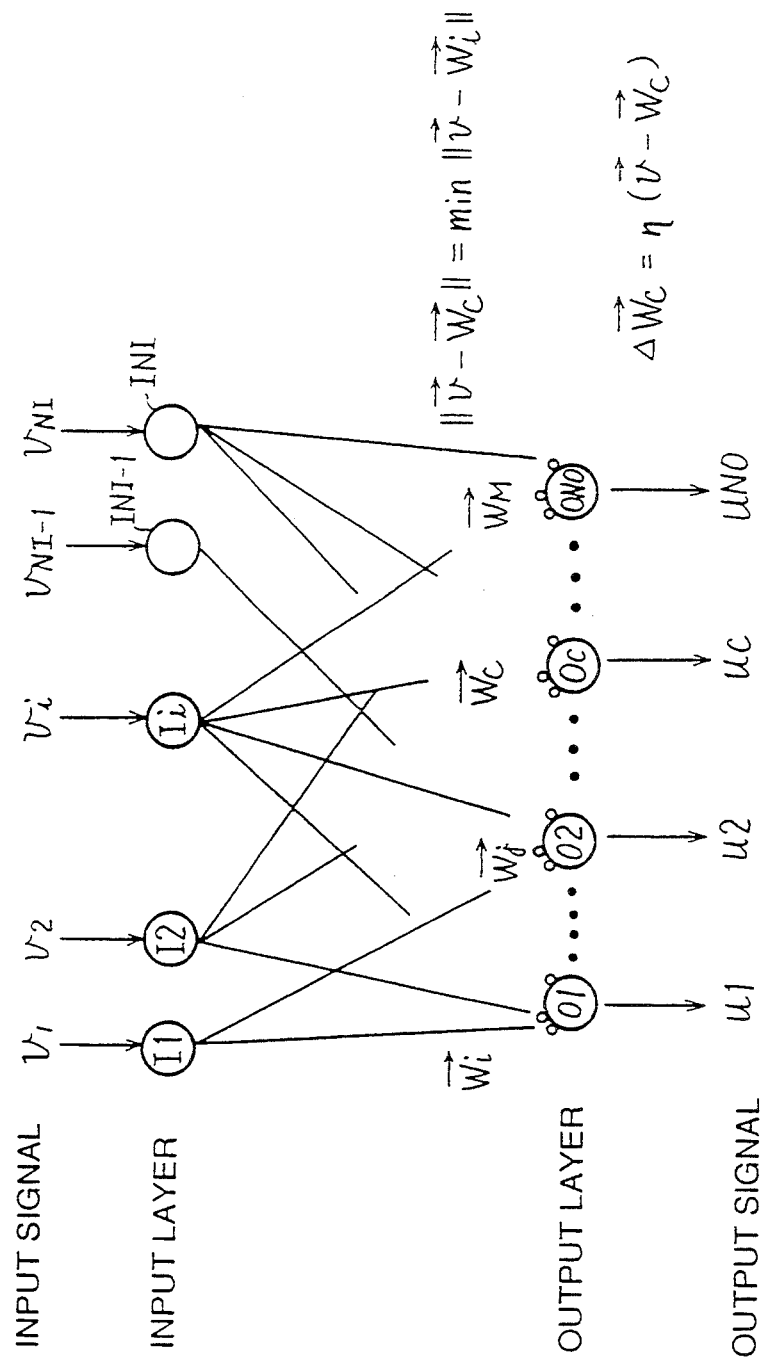
FIG. 9 illustrates an exemplary LVQ network structure.

FIG. 9 illustrates an exemplary structure of an LVQ network. Referring to FIG. 9, the LVQ network comprises a two-layer structure having NI input layer neurons I1 to INI and NO output layer neurons O1 to ONO. In general, the number NO of the output layer neurons is equal to a number M of categories to be identified. It is assumed that $\uparrow v^m$ (m=1, 2, ..., M) represents an input vector which is employed for learning, and Wij (i=1, 2, ..., NO, j=1, 2, ..., NI, where NO=M) represents a synapse load. The vector $\uparrow v^m$ is a set of input vectors belonging to an m-th category. It is also assumed that vectors $\uparrow$ Wi (Wi1, Wi2, ..., WiNI) forming synapse loads Wij are reference vectors, and Wc represents a vector which is most "approximate" to the input vector $\uparrow v^m$ among the reference vectors $\uparrow$ Wi. The term "approximate" may be employed in the meaning in Euclidean space, or in another concept. In learning, the vector Wc is updated as follows:

When the vector $\uparrow v^m$ is correctly classified:

$$\uparrow Wc(t+1) = \uparrow Wc(t) + \eta(t) \|$$

When the vector $\uparrow v^m$ is incorrectly classified:

$$\uparrow Wc(t+1) = \uparrow Wc(t) - \eta(t) \| \uparrow v^m - \uparrow Wc(t) \|$$

With respect to synapse load vectors $\uparrow$ Wi other than $\uparrow$ Wc:

$$\uparrow Wi(t+1) = \uparrow Wi(t)$$

where $\eta(t)$ represents a learning parameter $(0 < \eta < 1)$ which monotonously decreases with time, and represents the number of times of a learning. From the above equations, the reference vectors $\uparrow$ Wc approaches the input vector $\uparrow v^m$ upon correct classification, while the former goes far from the latter upon incorrect classification. Various learning vectors $\uparrow v^m$ are employed in accordance with categories to execute the aforementioned operation, thereby correcting the synapse load values. After completion of the learning, the corrected synapse load values are stored in weight memories.

Vectors minimizing the distance in Euclidean spaces are obtained as "approximate" vectors for input vectors. In this case, the following equation is employed:

$$\| \uparrow v^m - \uparrow Wc \| = min(\| \uparrow v^m - \uparrow Wi \|)$$

Alternatively, a vector minimizing the inner product $\uparrow v^m$. $\uparrow$ Wi of the vectors $\uparrow v^m$ and $\uparrow$ Wi may be employed.

When the synapse load vector Wi is standardized in completion of learning, $$ui = \uparrow Wi. \uparrow v^m$$

When the input vector $\uparrow v^m$ is inputted, therefore, the output ui of an i-th neuron Oi in the output layer neurons is maximum to enable category classification.

In a neural network which is based on the aforementioned LVQ method, required are not multiplication but differential operations of input data and synapse load values. Description is now made on a structure of a parallel operational semiconductor integrated circuit device which can flexibly cope with a neural network of an arbitrary model.

Figure 10:
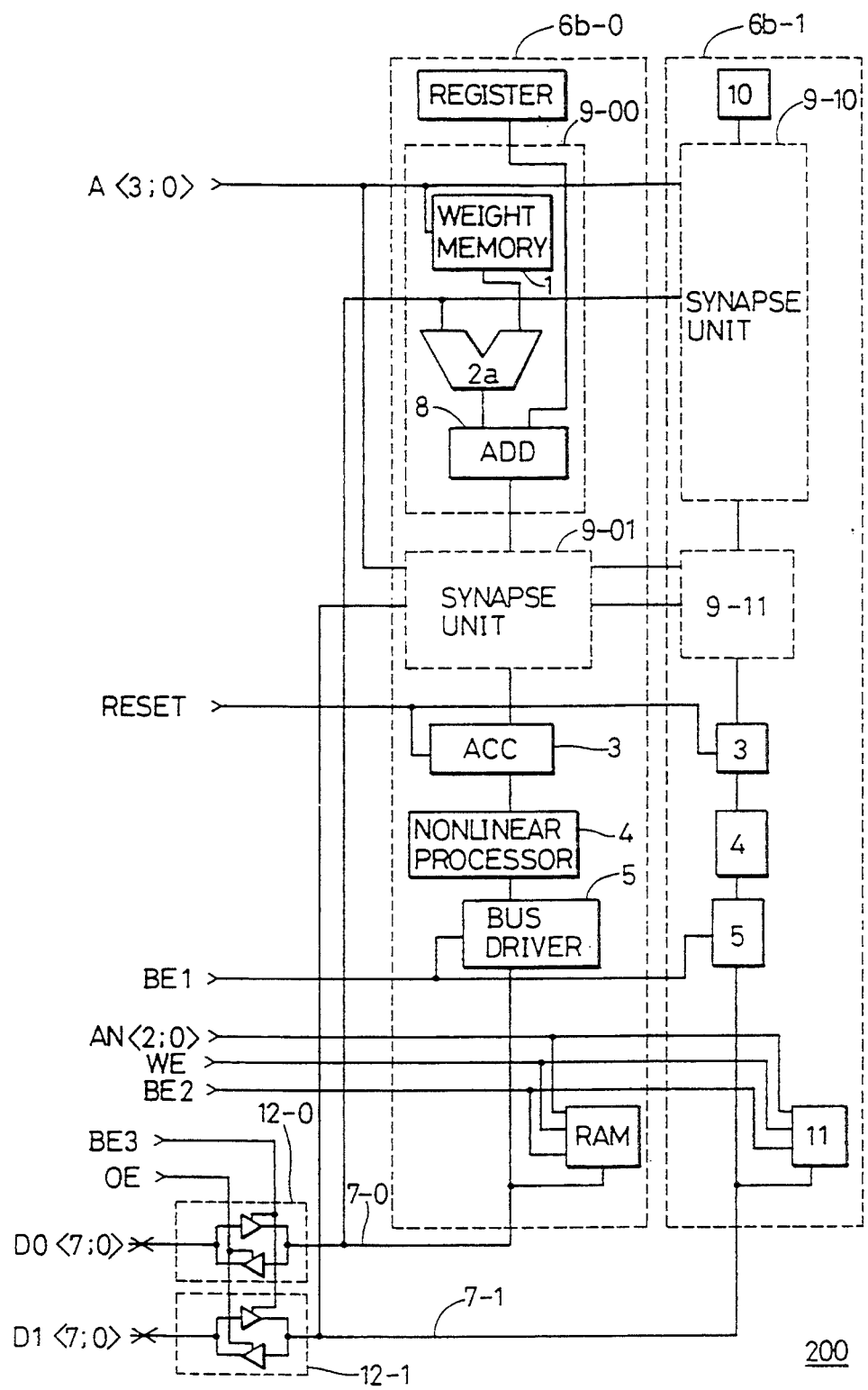
FIG. 10 illustrates an overall structure of a parallel operational semiconductor integrated circuit device according to a second embodiment of the present invention.

FIG. 10 illustrates an overall structure of a neurochip 200 according to a second embodiment of the present invention. The neurochip 200 shown in FIG. 10 is formed on a single semiconductor chip.

Referring to FIG. 10, the neurochip 200 includes two neuron units 6b-0 and 6b-1. These neuron units 6b-0 and 6b-1 are similar in structure to those of the neurochip 100 shown in FIG. 1, except that a general binary operational circuits 2a is provided in place of the multiplier 2 respectively. The binary operational circuits 2a may have arbitrary operational functions.

Figure 11:
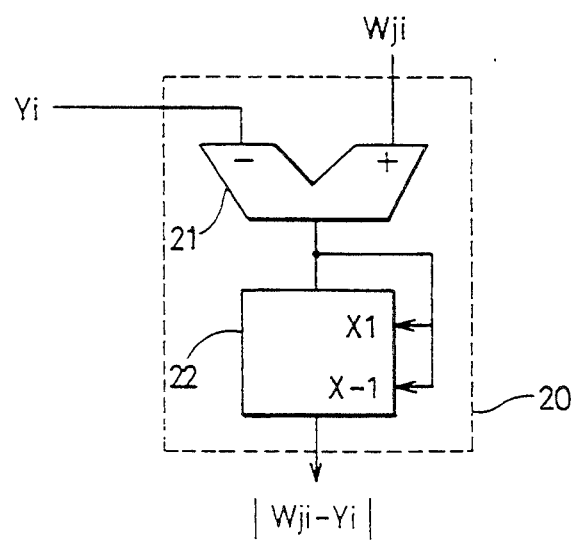
FIG. 11 illustrates another exemplary structure of a binary operational circuit shown in FIG. 10.

FIG. 11 illustrates a structure of an absolute differential value circuit 21 which is applied to each of the binary operational circuits 2a shown in FIG. 10. Referring to FIG. 11, the absolute differential value circuit 21 includes a subtracter 21 which takes difference between input data Yi and synapse load values Wji and an absolute value circuit 22 which inverts or non-inverts the output of the subtracter 21 for outputting. This absolute value circuit 22 inverts or non-inverts the output of the subtracter 21 in response to the sign bit thereof. When two's complement notation is employed in an inversion operation, the absolute value circuit 22 inverts all outputs of the subtracter 21 and adds 1 thereto. Thus, differential absolute values |Wji−Wi| of the synapse load values Wji and the input data Yi is obtained.

When the neurochip 200 expresses a neural network of an LVQ model, each binary operational circuit 2a is conveniently formed by the absolute differential value circuit 22 shown in FIG. 11. This is because calculation of $\Sigma|Wji-Wi|$ is frequently employed in distance calculation performed for obtaining synapse load vector which are most "approximate" to input vectors in learning of an LVQ model. The summation Z is carried out as to i. The synapse load vector Wi is formed by synapse load values of neurons. In order to obtain "approximate" vectors in the structure shown in FIG. 10, a minimum value circuit for obtaining the minimum value may be provided in common for accumulators 3 of the neuron units 6b-0 and 6b-1. When it is necessary to express three or more neurons, the minimum value circuit may have a function of comparing data held therein with newly supplied data and storing the smaller one.

It is possible to obtain a neural network which can easily cope with learning of an LVQ model by the aforementioned structure. Absolute differential value operations are carried out for an ordinary processing operation. A neuron unit having the maximum output is selected by an external maximum value circuit.

In an LVQ model, calculation of inner product of vectors may be employed in place of distance calculation. In this case, multiplication of input data and synapse load values is simply executed. In this case, a circuit for adding up the outputs of the accumulators 3 of the neuron units 6b-0 and 6b-1 and a minimum value circuit for obtaining the minimum output value of this adder circuit may be employed in the structure shown in FIG. 1.

Each binary operational circuit 2a may be formed not by the absolute differential value circuit 22 shown in FIG. 11 but by a square differential operational circuit. Similarly, it is possible to calculate Euclidean distances.

When a learning function is provided, each weight memory 1 may have both of write and read functions, similarly to the memory 11, in order to correct weight data.

Further, the synapse load values may be corrected along an LVQ model, so that processing (operation of the sum of products of synapse load values and input state signals) is executed in accordance with a model of ordinary neurons in actual operations. In this case, required are both of the absolute differential value circuit and a multiplier circuit.

Figure 12:
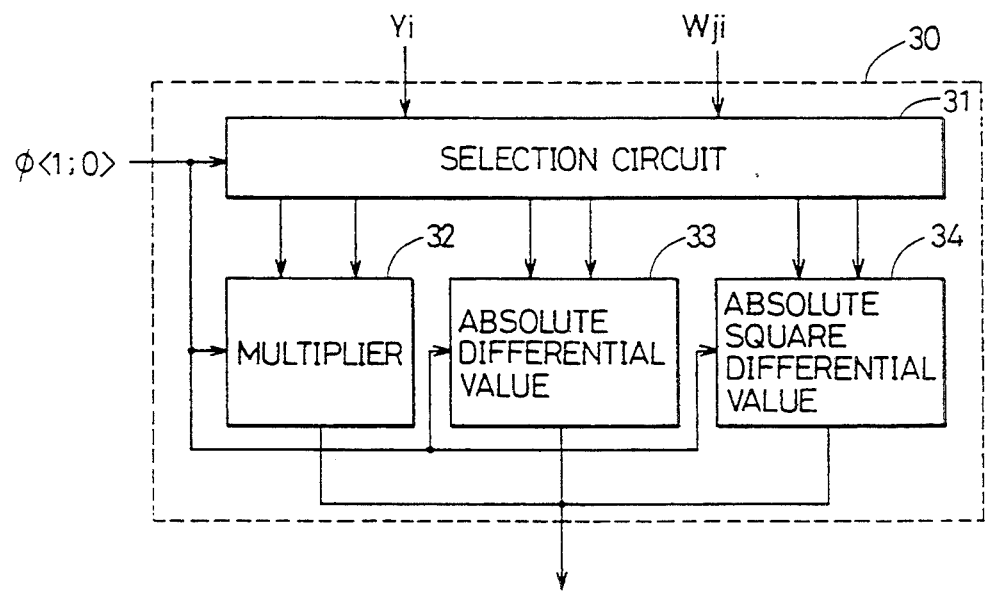
FIG. 12 illustrates still another exemplary structure of the binary operational circuit shown in FIG. 10.

FIG. 12 shows another structure of each binary operational circuit shown in FIG. 10. Referring to FIG. 12, a binary operational circuit 30 includes a multiplier 32 which is activated in response to a 2-bit selection signal $\phi<1;0>$, an absolute differential value circuit 33, a square absolute differential value circuit 34, and a selection circuit 31 for passing data Yi and Wji to a circuit for executing a selected function in response to the selection signal $\phi<1;0>$. When the binary operational circuit 30 shown in FIG. 12 is applied to each binary operational circuit 2a shown in FIG. 10, types of models of expressive neural networks are so increased that it is possible to remarkably enlarge applications. This binary operational circuit 30 may further comprise other operational functions.

Third Embodiment

The aforementioned first embodiment employs the parallel digital multipliers 2 of 8 by 8 bits, in order to calculate the products of the synapse load values Wji and the state values of the precedent stage neurons. Alternatively, multipliers of 1 by 8 bits may be employed under such a condition that state values Yi of precedent stage neurons are serially inputted successively from the least significant bit LSB.

Figure 13:
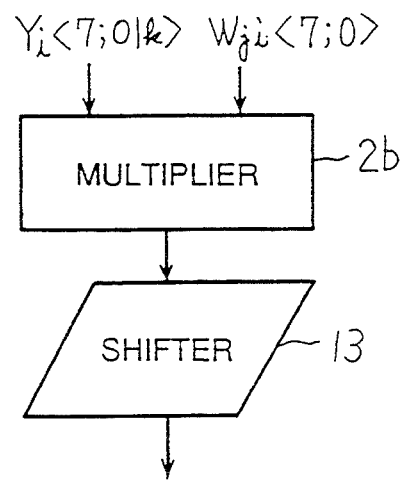
FIG. 13 illustrates a structure of a principal part of a parallel operational semiconductor integrated circuit device according to a third embodiment of the present invention.

FIG. 13 illustrates a structure of each multiplier which is employed for a neurochip according to a third embodiment of the present invention. Referring to FIG. 13, a circuit implementing a multiplication function includes a multiplier 2b of 1 by 8 bits for multiplying 1-bit precedent stage neuron state value Yi by 8-bit synapse load value Wji$<7;0>$, and a shifter 13 for shifting the outputs of the multiplier 2b toward high orders according to the digits of the neuron state value Yi.

Figure 14:
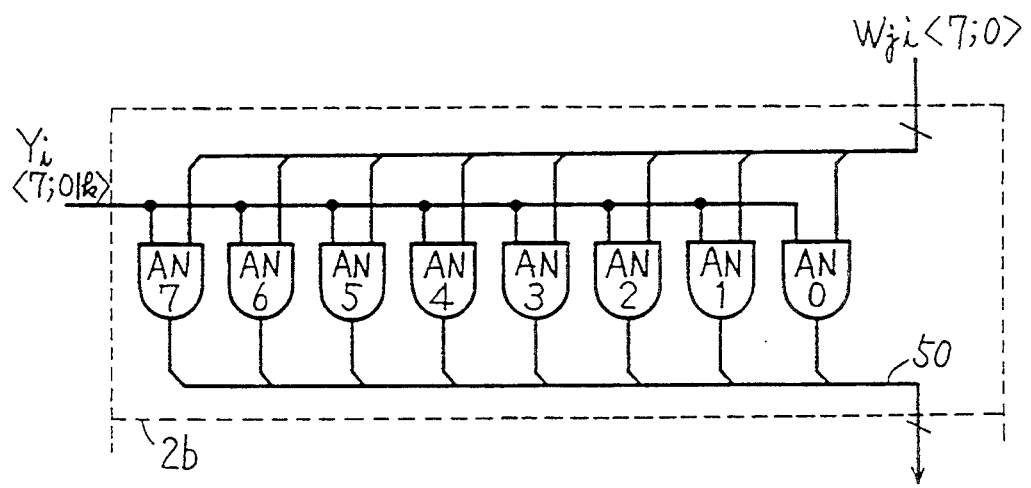
FIG. 14 illustrates an exemplary concrete structure of a multiplier shown in FIG. 13.

FIG. 14 shows the structure of the 1 by 8 bit multiplier 2b shown in FIG. 13. Referring to FIG. 14, the 1 by 8 bit multiplier 2b includes eight AND circuits AN0 to AN7, which are connected in parallel with each other. The AND circuits AN0 to AN7 are supplied with 1-bit neuron state value Yi at first inputs thereof and with corresponding bits of the 8-bit synapse load value Wji$<7;0>$ at second inputs thereof. Outputs of the AND circuits AN0 to AN7 are parallelly transmitted onto a bus 50. The AND circuit AN7 receives the most significant bit Wji$<7>$ of the synapse load value Wji$<7;0>$ at its second input, and the AND circuit AN0 receives the least significant bit Wji$<0>$ of the synapse load value Wji$<7;0>$. The 1 by 8 bit multiplier 2b has only eight AND circuits as shown in FIG. 14, whereby it is possible to reduce the number of elements forming a synapse unit.

The shifter 13 for arranging partial products in corresponding digit positions may be provided between the multiplier 2b and the accumulator 3.

Figure 15:
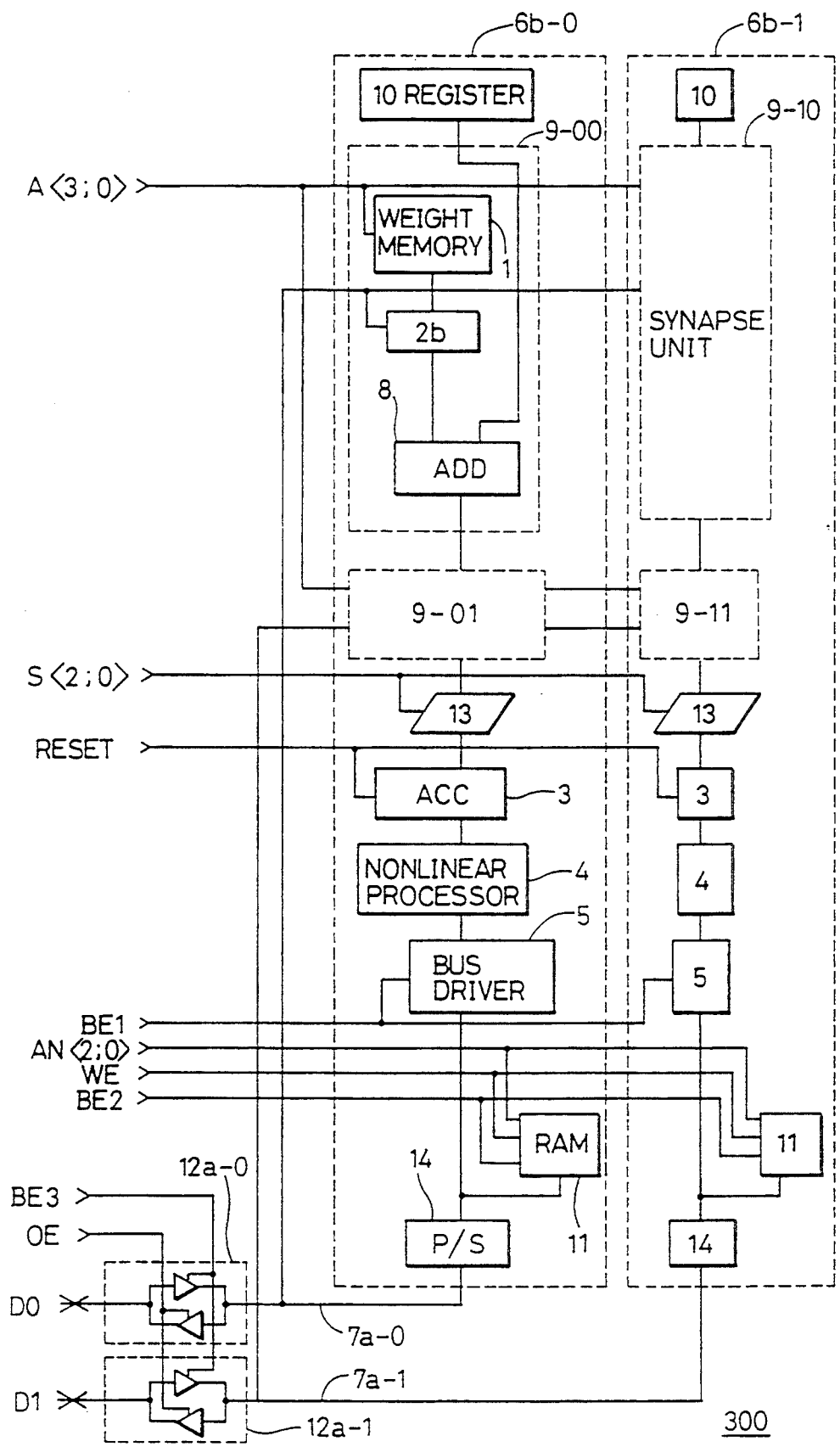
FIG. 15 illustrates an overall structure of a parallel operational semiconductor integrated circuit device employing the structure shown in FIG. 13.

FIG. 15 illustrates a structure of a neurochip 300 employing the 1 by 8 bit multipliers 2b shown in FIG.

13. Referring to FIG. 15, the neurochip 300 includes two neuron units 6b-0 and 6b-1, similarly to the structure shown in FIG. 1. The neuron units 6b-0 and 6b-1 include laterally connected synapse units 9-00, 9-01, 9-10 and 9-11 respectively. The synapse units 9-00, 9-01, 9-10 and 9-11 are identical in structure to those shown in FIG. 1, except that the multipliers 2b are 1 by 8 bit multipliers.

The neurochip 300 is identical in structure to that shown in FIG. 1, except that the same further includes shifters 13 which are provided on outputs of the final stage synapse units 9-01 and 9-11 of the neuron units 6b-0 and 6b-1 respectively, and parallel-to-serial converters 14 which are provided between 1-bit data lines 7a-0 and 7a-1 and bus drivers 5.

The shifters 13 provided in the neuron units 6b-0 and 6b-1 shift bit positions of outputs from the synapse units 9-01 and 9-11 (adders 8) in response to a 3-bit shift control signal $S<2;0>$. The shift control signal $S<2;0>$ decides bit shift numbers in the shifters 13.

The parallel-to-serial converters 14 convert 8-bit parallel outputs supplied from the bus drivers 5 or memories 11 to a bit by bit serial sequence, to transmit the same onto the data lines 7a-0 and 7a-1 respectively. The data lines 7a-0 and 7a-1 transmit the data to the multipliers 2b provided in the synapse units 9-00, 9-10, 9-01 and 9-11, similarly to the structure shown in FIG. 1.

In correspondence to the 1-bit data lines 7a-0 and 7a-1, bus interface circuits 12a-0 and 12a-1 transfer data with data input/output nodes D0 and D1 on a bit-by-bit basis. Input or output buffers provided in the bus interface circuits 12a-0 and 12a-1 are activated according to the logic of signals supplied to control nodes BE3 and OE, similarly to the structure shown in FIG. 1.

In the structure shown in FIG. 15, the shifters 13 shift in bit positions the results of final addition, to supply the same to the accumulators 3.

According to this structure, the data are inputted from and outputted to the exterior in bit serial sequence, whereby it is possible to reduce the number of input-/output nodes D0 and D1 thereby reducing the number of data input/output pins when the neurochip 300 is singly employed.

In the structure shown in FIG. 15, a single neuron unit is provided with only one shifter, whereby it is possible to suppress increase in number of elements forming neuron units.

Figure 16:
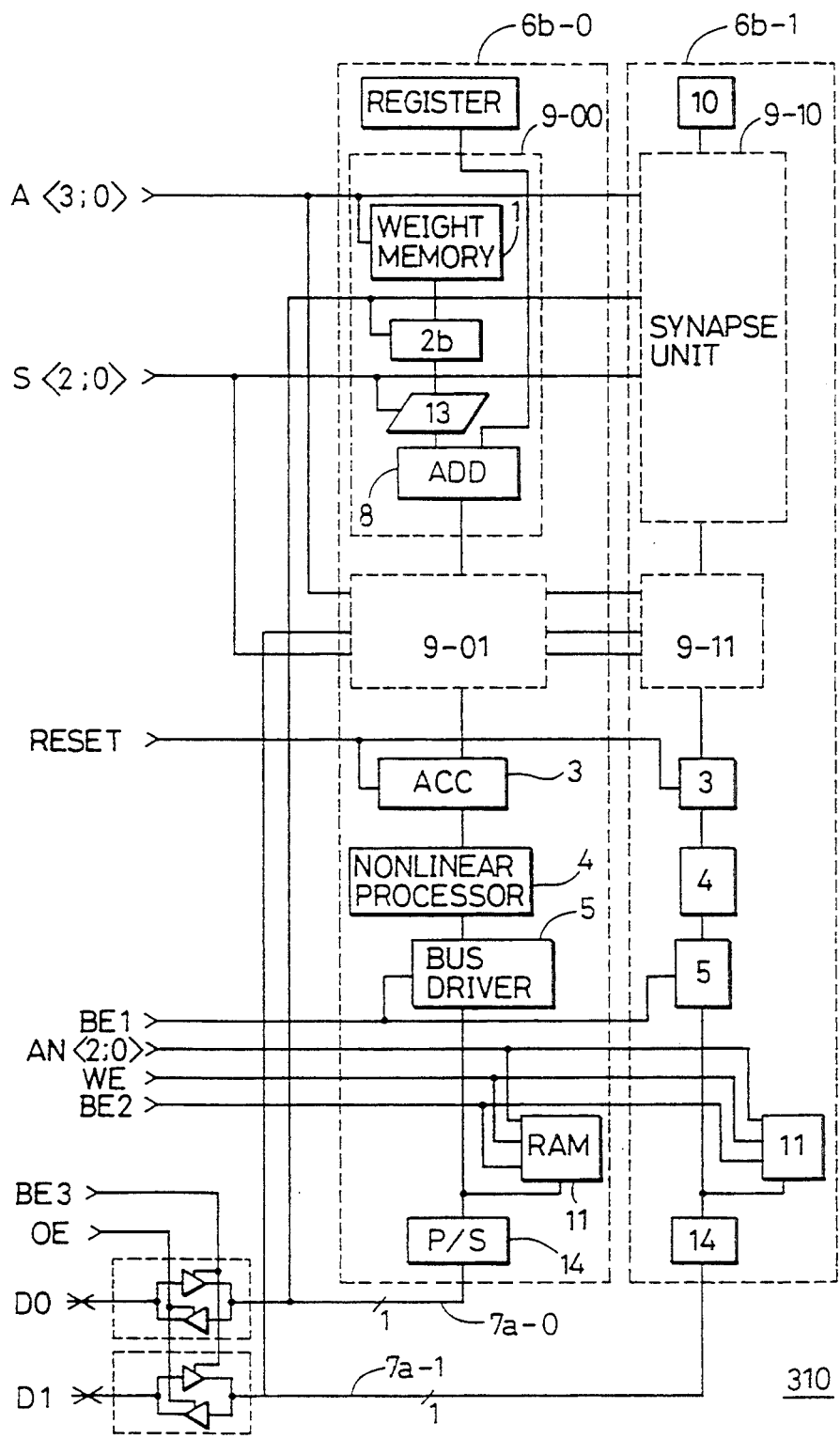
FIG. 16 illustrates another exemplary structure of a parallel operational semiconductor integrated circuit device employing the structure shown in FIG. 13.

FIG. 16 illustrates another exemplary structure of a neurochip 310 employing 1 by 8 bit multipliers 2b. Referring to FIG. 16, the neurochip 310 is identical in structure to the neurochip 300 shown in FIG. 15, except that shifters 13 are provided between the multipliers 2b and adders 8 in respective ones of synapse units 9-00, 9-01, 9-10 and 9-11. In the neurochip 310 shown in FIG. 16, a single synapse unit is provided with one shifter. Also in this structure, it is possible to attain an effect similar to that of the neurochip 300 shown in FIG. 15.

Fourth Embodiment

In the aforementioned embodiments, the adders 8 included in the synapse units are laterally connected for adding the results of multiplication or synapse operations of absolute differential values or the like. Such adders and lateral connection structures are now described more specifically.

Figure 17:
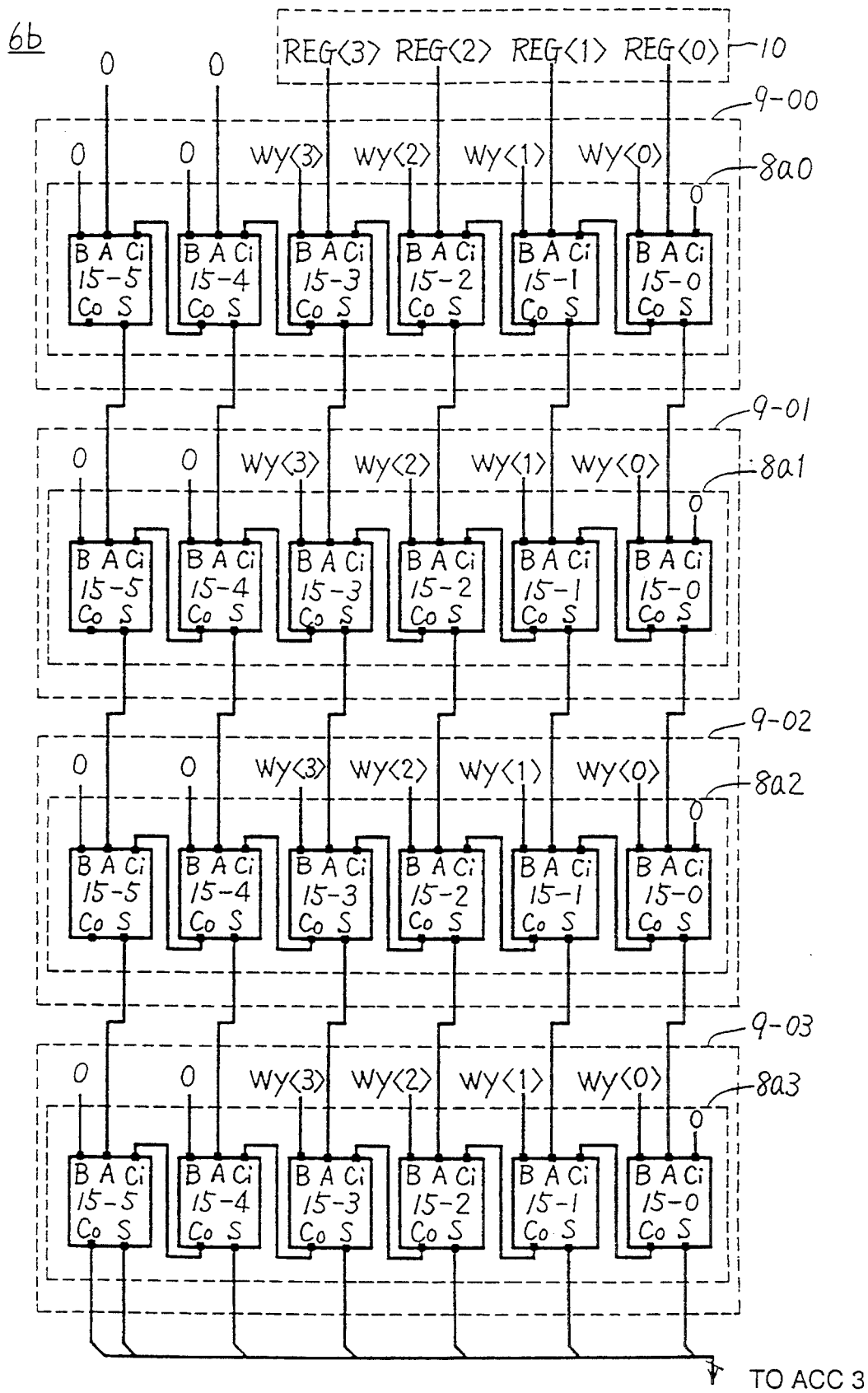
FIG. 17 illustrates an exemplary lateral connection structure of adders in a parallel operational semiconductor integrated circuit device according to the present invention.

FIG. 17 illustrates a structure of a main part of a neurochip according to a fourth embodiment of the present invention. Referring to FIG. 17, a single neuron unit 6b includes four synapse units 9-00, 9-01, 9-02 and 9-03. Referring to FIG. 17, it is assumed that a register 10 stores 4-bit data $REG<3;0>$ and multipliers output 4-bit data $wy<3;0>$, in order to simplify illustration.

The synapse units 9-00 to 9-03 include adders 8a0, 8a1, 8a2 and 8a3 respectively. These adders 8a0 to 8a3 have the same structures of ripple carry adders each including six full adders 15-5 to 15-0. Each of the full adders 15-0 to 15-5 includes a carry input Ci, addition inputs A and B, a sum output S and a carry output Co. In a single adder 8a, the carry outputs Co of the full adders 15-x (x=0 to 4) are connected to the carry inputs Ci of one bit higher order full adders 15-x+1.

Respective sum outputs of the full adders 15-0 to 15-5 are supplied to the inputs A of the full adders provided in the subsequent stage synapse units. The respective full adders 15-0 to 15-3 are supplied with corresponding bits of the synapse operation result $wy<3;0>$.

In such lateral connection, the outputs of the final stage adder 8a3 are supplied to an accumulator 3.

In the structures of the adders shown in FIG. 17, carries are successively transmitted in a single adder.

Figure 18:
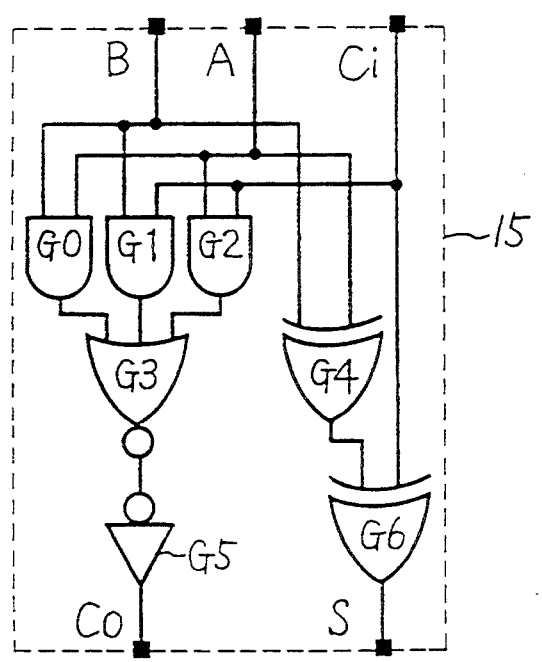
FIG. 18 is a logic circuit diagram showing a structure of each full adder shown in FIG. 17.

FIG. 18 illustrates an exemplary structure of each full adder 15 shown in FIG. 17. Referring to FIG. 18, the full adder 15 representing each of the full adders 15-0 to 15-5 includes an AND circuit G0 for receiving the addition inputs A and B, an AND circuit G1 for receiving the addition input B and the carry input Ci, an AND circuit G2 for receiving the addition input A and the carry input Ci, a 3-input NOR circuit G3 for receiving the outputs of the AND circuits G0 to G3, an exclusive OR (ExOR) circuit G4 for receiving the addition inputs A and B, an inverter circuit G5 for receiving the output of the NOR circuit G3, and an ExOR circuit G6 for receiving the output of the ExOR circuit G4 and the carry input Ci. The output of the inverter circuit G5 is supplied to the carry output Co, while the output of the ExOR circuit G6 is supplied to the sum output S. The full adder 15 shown in FIG. 18 causes three-stage gate delay.

In addition to the adders of the ripple carry structure shown in FIG. 17, there are carry look ahead adders, which are adapted to reduce delay times due to carry propagation by looking ahead presence/absence of carries.

In general, however, an adder causes a delay of several stages of full adders due to carry propagation. In the structure shown in FIG. 17, four stages of adders 8a are serially (laterally) connected with each other. Thus, the sum of delays associated with addition is further increased.

Figure 19:
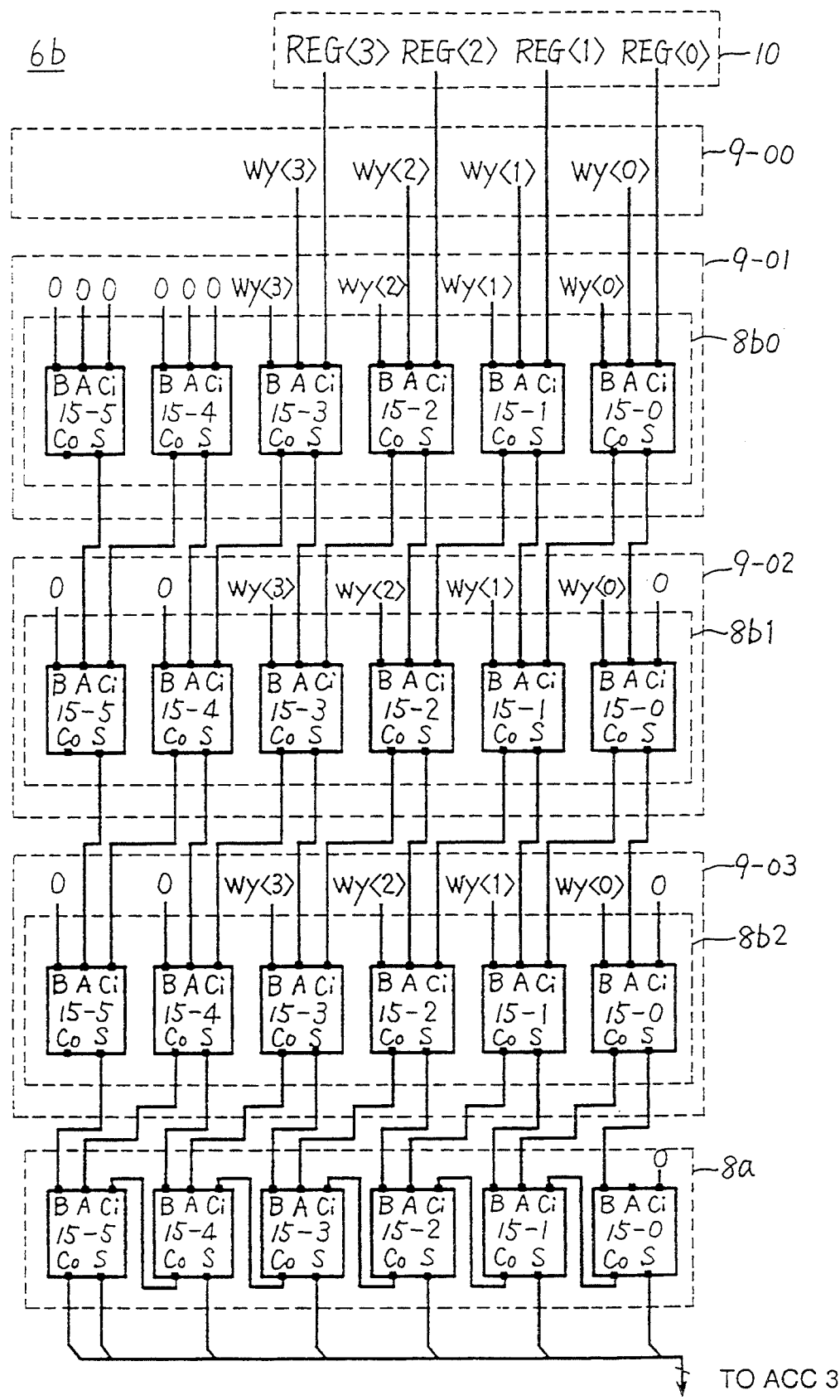
FIG. 19 illustrates a structure of a main part of a parallel operational semiconductor integrated circuit device according to a fourth embodiment of the present invention.

FIG. 19 illustrates an improved example of the neurochip according to the fourth embodiment of the present invention. In the structure shown in FIG. 19, a single neuron unit 6b comprises four synapse units 9-00 to 9-03, similarly to the structure shown in FIG. 17. Referring to FIG. 19, the synapse units 9-01 to 9-03 include 3-to-2 compressors 860 to 862 as adders. Such 3-to-2 compressor 8b, generically indicating the compressors 860 to 862, has inputs and outputs in a ratio of 3:2. Each compressor 8b includes six full adders 15-0 to 15-5, which are arranged in parallel with each other.

The first-stage synapse unit 9-00 is provided with no compressor 8b. First inputs of the compressor 860 provided in the second-stage synapse unit 9-01 is supplied with synapse operation result (outputs of multipliers) $wy<3;0>$ of this first-stage synapse unit 9-00 and data $REG<3;0>$ held in a register 10.

In each compressor 8b, second inputs (B inputs of full adders 15) are supplied with output wy<3;0> from corresponding multipliers.

The outputs of each compressor 8b, i.e., outputs S and Co of the full adders 15 are supplied to the first inputs of the next-stage compressor (A inputs of the full adders 15; the first inputs include the A inputs and carry inputs). More specifically, the sum outputs S of the full adders 15-0 to 15-5 are supplied to the A inputs of the full adders 15-0 to 15-5 of the same digits included in the subsequent stage compressor. The carry outputs Co of the full adders 15-0 to 15-4 included in each compressor 8b are transmitted to the carry inputs Ci of bitwise higher order full adders 15-1 to 15-5 included in the subsequent stage compressor 8b. The carry output Co of the leftmost full adder 15-5 is not utilized. In the full adders 15-4 and 15-5, inputs receiving no operation result data are supplied with binary signals of logic The neuron unit 6b further includes an adder 8a for adding the outputs of the compressor 862 of the final stage synapse unit 9-03. This adder 8a includes six full adders 15-0 to 15-5 which are arranged in a ripple carry connection structure. The sum outputs S of the full adders 15-0 to 15-5 provided in the compressor 862 are connected to B inputs of the same digits of full adders 15-0 to 15-5 provided in the adder 8a. The carry outputs Co of the full adders 15-0 to 15-4 provided in the compressor 862 are connected to inputs of bitwise higher order full adders 15-1 to 15-5-provided in the adder 8a. In this adder 8a, the carry outputs Co of the full adders 15-0 to 15-4 are supplied to the carry inputs Ci of bitwise higher order full adders 15-1 to 15-5. The sum outputs S of the full adders 15-0 to 15-5 provided in the adder 8a and the carry output Co of the full adder 15-5 are parallelly supplied to an accumulator 3.

The structure shown in FIG. 19 requires the adder 8a for further adding the outputs of the final stage synapse unit 9-03 (the outputs of the compressor 862), due to employment of the 3-to-2 compressors 8b. This structure is similar to that of a parallel multiplier.

It can be considered that structures forming a sum of partial products in a parallel multiplier correspond to the compressors 8b and a final adder for forming the final product from the sum of partial products corresponds to the adder 8a. Although the sum of partial products is shifted in bit position toward high orders in the multiplier, no such shifting of sum of partial products is present in the structure shown in FIG. 19.

In the structure shown in FIG. 19, it is necessary to provide the adder 8a subsequent to the outputs of the final stage synapse unit 9-03, due to employment of the 3-to-2 compressors 8b. However, no carry propagation is present in the respective 3-to-2 compressors 8b which are connected in series to each other. Delay in the compressor 8b is that of single stage of the full adder 15. Therefore, the sum of delays in adding operations is remarkably reduced as compared with the structure shown in FIG. 17. Further, the structure employing compressors shown in FIG. 19 has an advantage of reduction in circuit scale as compared with that employing carry look ahead adder. The carry look ahead adders are generally increased in structure since the same require a circuit structure for previously finding whether or not carries are generated.

Fifth Embodiment

Figure 20:
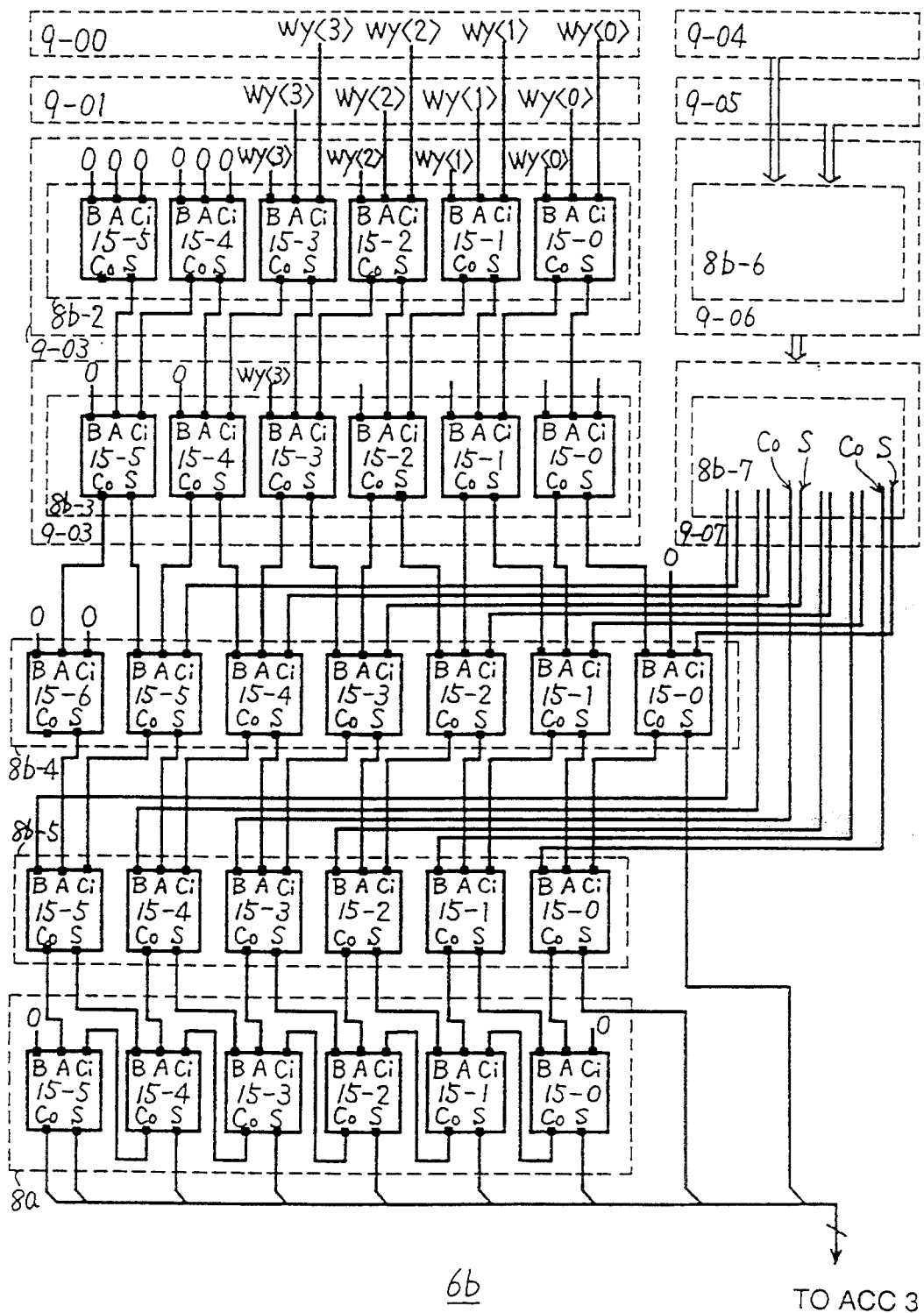
FIG. 20 illustrates a structure of a main part of a parallel operational semiconductor integrated circuit device according to a fifth embodiment of the present invention.

FIG. 20 illustrates a structure of a neurochip according to a fifth embodiment of the present invention. Referring to FIG. 20, a single neuron unit 6b includes eight synapse units 9-00, 9-01, 9-02, 9-03, 9-04, 9-05, 906 and 9-07. These synapse units 9-00 to 9-07 are divided into two groups. One group includes the synapse units 900, 9-01, 9-02 and 9-03, which are laterally connected with each other. The other group includes the synapse units 9-04, 9-05, 9-06 and 9-07, which are laterally connected with each other.

The synapse units 9-02 and 9-03 include 3-to-2 compressors 8b-2 and 8b-3 respectively. The compressor 8b-2 receives synapse operation results wy<3;0> from the synapse units 9-00 and 9-01 and those in the synapse unit 9-02. The 3-to-2 compressor 8b-3 receives the outputs of the compressor 8b-2 and synapse operation results in the synapse unit 9-03 itself. The 3-to-2 compressors 8b-2 and 8b-3 are connected in a similar manner to those in FIG. 19.

The synapse units 9-04, 9-05, 9-06 and 9-07 are also connected in a similar manner to the above so that 3-to-2 compressors 8b-6 and 8b-7 are laterally connected similarly to the 3-to-2 compressors 8b-2 and 8b-3.

In order to obtain final addition from the outputs of the final stage compressors 8b-3 and 8b-7 in the lateral connection, further provided are a 3-to-2 compressor 8b-4 for receiving the outputs of the 3-to-2 compressors 8b-3 and 8b-7, a 3-to-2 compressor 8b-5 for receiving the outputs of the 3-to-2 compressors 8b-4 and 8b-7, and an adder 8a for receiving the outputs of the 3-to-2 compressor 8b-5.

The 3-to-2 compressor 8b-4 receives sum outputs S and carry outputs Co of the 3-to-2 compressor 8b-3 as well as sum outputs S of the 3-to-2 compressor 8b-7. The 3-to-2 compressor 8b-4 includes seven full adders 15-0 to 15-6. More specifically, the full adders 15-0 to 15-6 of the 3-to-2 compressor 8b-4 receive the sum outputs S of full adders provided in corresponding bit positions of the compressor 8b-3 and carry outputs Co of one bit lower order full adders of the 3-to-2 compressor 8b in A inputs thereof, and the sum outputs S of the same digits of full adders in the 3-to-2 compressor 8b-7 in carry inputs Ci thereof.

The 3-to-2 compressor 8b-5 includes six full adders 15-0 to 15-5 which are shifted to higher order positions by one bit with respect to the full adders 15-0 to 15-6 of the 3-to-2 compressor 8b-4. The sum output S of the least significant bit full adder 15-0 of the 3-to-2 compressor 8b-4 is supplied to an accumulator 3 as the least significant bit. The full adders 15-0 to 15-5 of the 3-to-2 compressor 8b-5 receive carry outputs Co of the full adders 15-0 to 15-5 of the 3-to-2 compressor 8b-4 in carry inputs Ci thereof and receive the sum outputs S of the full adders 15-1 to 15-6 of the 3-to-2 compressor 8b-4 in A inputs thereof while receiving carry outputs Co of the full adders 15-0 to 15-5 of the 3-to-2 compressor 8b-7 in B inputs thereof.

The adder 8a includes six full adders 15-0 to 15-5 which are arranged in a ripple carry connection structure. The full adders 15-0 to 15-5 of the adder 8a receive the carry outputs Co of the full adders 15-0 to 15-5 of the 3-to-2 compressor 8b-5 in A inputs thereof, while receiving sum outputs S of the full adders 15-1 to 15-5 in one bit higher order positions of the B-to-2 compressor 8b-5 in B inputs thereof. The sum output S of the least significant bit full adder 15-0 provided in the 3-to-2 compressor 8b is supplied to the accumulator 3 as a second bit. The outputs of the adder 8a are supplied to the accumulator 3 in parallel with the sum outputs S of the least significant bit full adders 15-0 in the 3-to-2 compressors 8b-4 and 8b-5.

Thus, it is possible to reduce the number of serial stages of synapse units and suppress increase in delay time caused by lateral connection, by dividing the synapse units into a plurality of groups and executing parallel operations in the respective groups, as shown in FIG. 20.

In the structure shown in FIG. 20, the synapse units are divided into two groups, while the two-stage 3-to-2 compressors 8b-4 and 8b-5 and the adder 8a are further provided in order to obtain final addition from the outputs of the final stage 3-to-2 compressors 8b-3 and 8b-7 in the respective groups. The two-stage 3-to-2 compressors 8b-4 and 8b-5 and the single-stage adder 8a correspond to lateral connection of three synapse units (in employment of register outputs; refer to FIG. 17). When no register outputs are employed, a single 3-to-2 compressor is required at the minimum. In order to sufficiently take an advantage of dividing synapse units into two series (two groups), for example, it is necessary to increase the number of synapse units per neuron in excess of six, as hereafter described more specifically (eight synapse units are provided in FIG. 20).

When six synapse units are laterally connected with each other, five-stage 3-to-2 compressors and a single-stage adder are required in employment of register outputs. When no register outputs are employed, on the other hand, the number of 3-to-2 compressors is reduced by one. When the six synapse units are divided into two groups, a delay caused in a single group corresponds to the sum of delays in four-stage 3-to-2 compressors and a single-stage adder in employment of register outputs, while such a delay corresponds to the sum of those of three-stage 3-to-2 compressors and a single-state adder in employment of no register outputs. When the synapse units are divided into groups, therefore, it is possible to attain an effect of delay reduction when six synapse units are present per neuron at the minimum.

Sixth Embodiment

Figure 21:
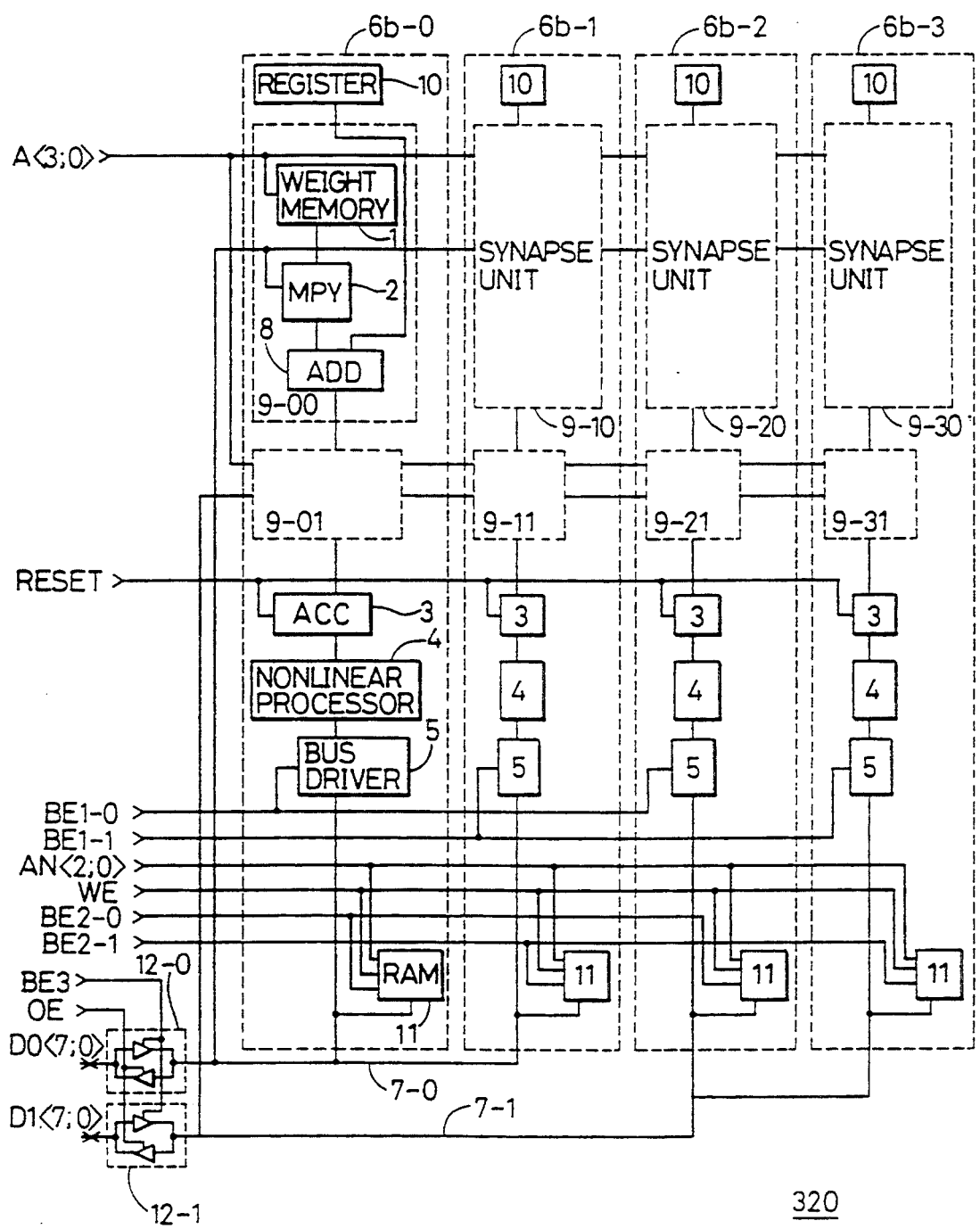
FIG. 21 illustrates an overall structure of a parallel operational semiconductor integrated circuit device according to a sixth embodiment of the present invention.

FIG. 21 illustrates a structure of a neurochip 320 according to a sixth embodiment of the present invention. Referring to FIG. 21, the neurochip 320 includes four neuron units 6b-0, 6b-1, 6b-2 and 6b-3. Each of the neuron units 6b-0 to 6b-3 includes two synapse units. Namely, the neuron unit 6b-0 includes synapse units 9-00 and 9-01 and the neuron unit 6b-1 includes synapse units 9-10 and 9-11, while the neuron unit 6b-2 includes synapse units 9-20 and 9-21 and the neuron unit 6b-3 includes synapse units 9-30 and 9-31.

The neuron units 6b-0 to 6b-3 each further include an accumulator 3, a nonlinear processor 4, a bus driver 5 and a memory 11, similarly to the structure shown in FIG. 1.

The neurochip 320 further includes an internal data bus 7-0 which is coupled with a data input/output node D0<7;0> through a bus interface circuit 12-0, and another internal data bus 7-1 which is coupled with another data input/output node D1<7;0> through another bus interface circuit 12-1. The internal data bus 7-0 is coupled with the upper synapse units 9-00, 9-10, 9-20 and 9-30 of the neuron units 6b-0 to 6b-3 in common. On the other hand, the internal data bus 7-1 is coupled with the lower synapse units 9-01, 9-11, 9-21 and 9-31 of the neuron units 6b-0 to 6b-3 in common.

Each of the neuron units 6b-0 to 6b-3 includes two synapse units. Therefore, it is possible to simultaneously execute synapse operations with respect to two precedent stage neurons. When synapse operations are executed with data stored in the memories 11 of the neuron units 6b-0 to 6b-3, therefore, two neuron units are selected from the neuron units-6b-0 to 6b-3 so that the synapse operations are executed with the data stored in the memories 11 of the selected neuron units. Thus, the neuron units 6b-0 to 6b-3 are divided into two groups. In the structure shown in FIG. 21, the neuron units 6b-0 and 6b-2 form one group, while the neuron units 6b-1 and 6b-3 form the other group.

In order to execute operations in the unit of group, an enable signal BE1-0 is supplied to the bus drivers 5 of the neuron units 6b-0 and 6b-2, while another enable signal BEi-1 is supplied to the bus drivers 5 of the neuron units 6b-1 and 6b-3. A read control signal BE2-0 is supplied to the memories 11 of the neuron units 6b-0 and 6b-2, while another read control signal BE2-1 is supplied to the memories 11 of the neuron units 6b-1 and 6b-3. Due to the control signals BE1-0, BEI-1, BE2-0 and BE2-1, operational result data or intermediate result data of one of the neuron units 6b-0 and 6b-1 are transmitted to the internal data bus 7-0, while those of one of the neuron units 6b-2 and 6b-3 are transmitted onto the internal data bus 7-1.

In the aforementioned structure, the number (hereinafter referred to as "neuron") of the neuron units provided in the neurochip 320 is a multiple of the number (hereinafter referred to as "#synapse") of the synapse units per neuron unit. Namely #neuron:#synapse=4:2. Thus, pairs of the neuron units are divided into two groups. When #neuron/#synapse=N, neuron units are generally divided into groups each including N neuron units, so that those forming a single group are multiplexed to be connected to a single data bus. The numbers of the internal data buses 7 and the data input/output nodes are increased in response to that of the synapse units. It is possible to connect a large number of neuron units without increasing the number of internal data buses provided in the chip, thereby easily expanding the system.

Seventh Embodiment

Figure 22:
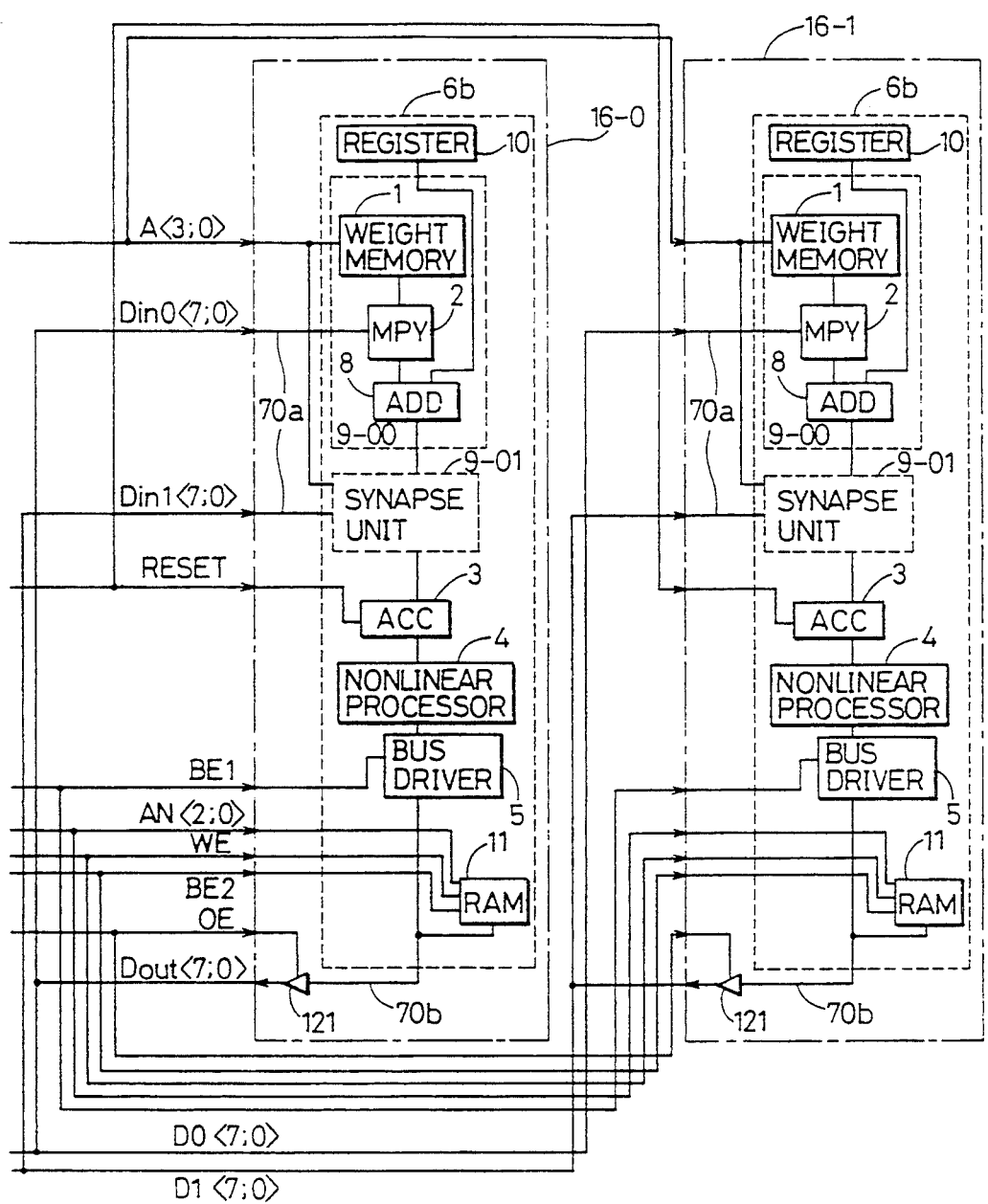
FIG. 22 illustrates a connection structure for a plurality of parallel operational semiconductor integrated circuit devices according to the present invention.

FIG. 22 shows an arrangement of neurochips according to a seventh embodiment of the present invention. Referring to FIG. 22, two neurochips 16-0 and 16-1 are interconnected to form a single parallel operational system. The neurochips 16-0 and 16-1 each include a single neuron unit 6b. The neuron units 6b provided in the neurochips 16-0 and 16-1 include pairs of synapse units 9-00 and 9-01. The neuron units 6b each also include an accumulator 3, a nonlinear processors 4, a bus driver 5, and a memory 11. The outputs of the bus driver 5 and data of the memory 11 are coupled to internal output bus 70b, to be coupled to external data buses D0<7;0> or D1<7;0> through output buffer-121 respectively. Multipliers 2, which may be formed from other binary operational circuits, of the synapse units 9-00 and 9-01 provided in the neuron units 6b are supplied with input data Din0<7;0> and Din1<7;0> through internal write data buses 70a respectively.

In the structure shown in FIG. 22, the two neurochips 16-0 and 16-1 are interconnected in the exterior of the chips. The internal output data bus 70b of the neurochip 16-0 is coupled to the external data bus D0<7;0> through the output buffer 121, while the internal output data bus 70b of the neurochip 16-1 is connected to the external data bus D1<7;0> through the output buffer 121. The external data buses D0<7;0> and D1<7;0> are coupled to data input/output nodes Din0<7;0> and Din1<7;0> of the neurochips 16-0 and 16-1 respectively. Other control signals are identical to those shown in FIG. 1. Control signals denoted by the same symbols are connected in common in the exterior of the neurochips 16-0 and 16-1. Thus, the two neurochips 16-0 and 16-1 are identical in connection structure to that shown in FIG. 1.

When the #neuron is less than the #synapse as hereinabove described, it is possible to construct a system which can simultaneously drive all synapse units for executing parallel operational processing, by interconnecting a plurality of neurochips.

Also when the #neuron and the synapse have other values, it is possible to form a parallel operational system by expanding the connection mode shown in FIG. 21 or 22. Particularly when the #neuron is a multiple of the #synapse or vice versa, it is possible to equivalently make synapse=#neuron by multiplexing connection between outputs of synapse units and neuron units or employing a plurality of neurochips, thereby implementing a simple system structure. Such a structure is now described more specifically.

Figure 23A:
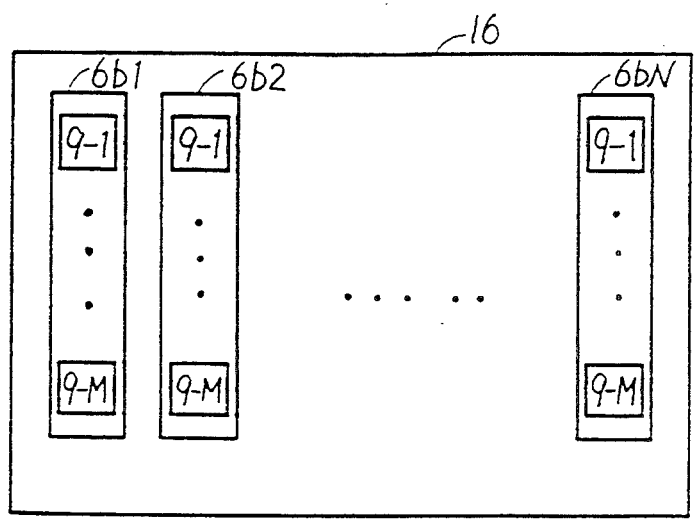
FIGS. 23A and 23B illustrate an interconnection of neurochips for forming a system using a plurality of parallel operational semiconductor integrated circuit devices according to the present invention.
Figure 23B:
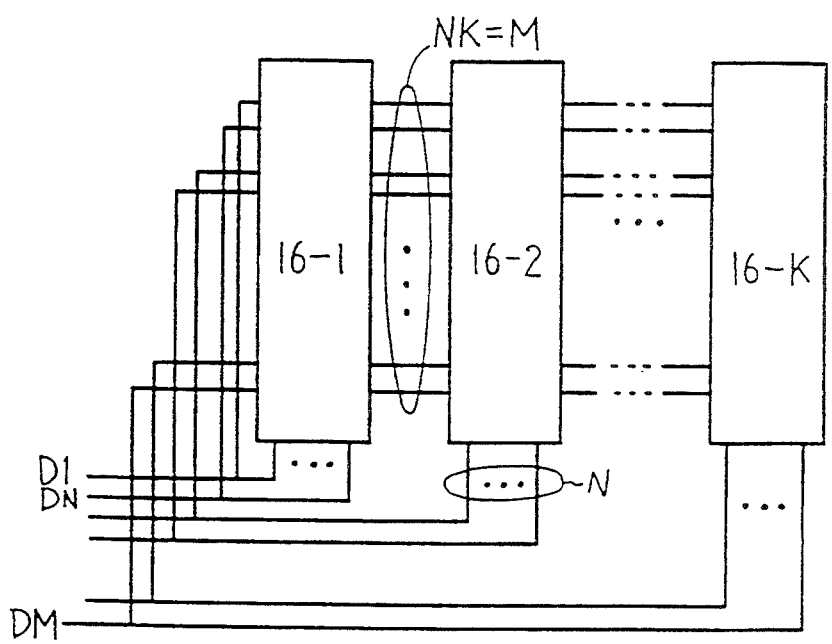

FIGS. 23A and 23B illustrate a general connection structure according to the seventh embodiment of the present invention. Referring to FIG. 23A, a neurochip 16 includes N neuron units 6b1 to 6bN. Each of the neuron units 6b1 to 6bN includes M synapse units 9-1 to 9-M. It is assumed here that #synapse/#neuron=M/N=K, where K is an integer. In this case, it is possible to construct a parallel operational system using K neurochips 16.

FIG. 23B shows a connection structure of a multi-chip system employing a plurality of (K) neurochips shown in FIG. 23A. Referring to FIG. 23B, the outputs from respective neuron units (6b1 to 6bN) of the neurochips 161 to 16-K are fed back to be supplied to respective synapse units (9-1 to 9-M) thereof in common. At this time, the outputs from the respective neuron units of each of the neurochips 16-1 to 16-K are coupled to different synapse units provided in the neuron units of this neurochip 16.

The neurochips 16-1 to 16-K form N.K (=M) outputs in total. The N.K outputs are parallelly fed back to the neurochips 16-1 to 16-K in common. The number of synapse units included in a single neuron unit, i.e., the #synapse is M (=N.K). Thus, the number of neuron units is equal to that of synapse units included in a single neuron unit in this multi-chip system, whereby it is possible to construct a parallel operational processing system which can efficiently execute synapse operations. Referring to FIG. 23B, the neurochips 16-1 to 16-K are interconnected through external data buses D1 to DN to DM.

When the neuron is greater than the #synapse, on the other hand, it is possible to equalize the numbers of neuron units and synapse units operating in a single operation cycle with each other by grouping neuron units in a single neurochip and selectively, multiplexing and connecting the grouped neuron units to a single data bus. Such a structure can be easily derived from that shown in FIG. 21.

When the #neuron is greater than the #synapse, further, it is also possible to construct a neural network by switching connection in place of multiplexing the neuron units in the chip.

Figure 24A:
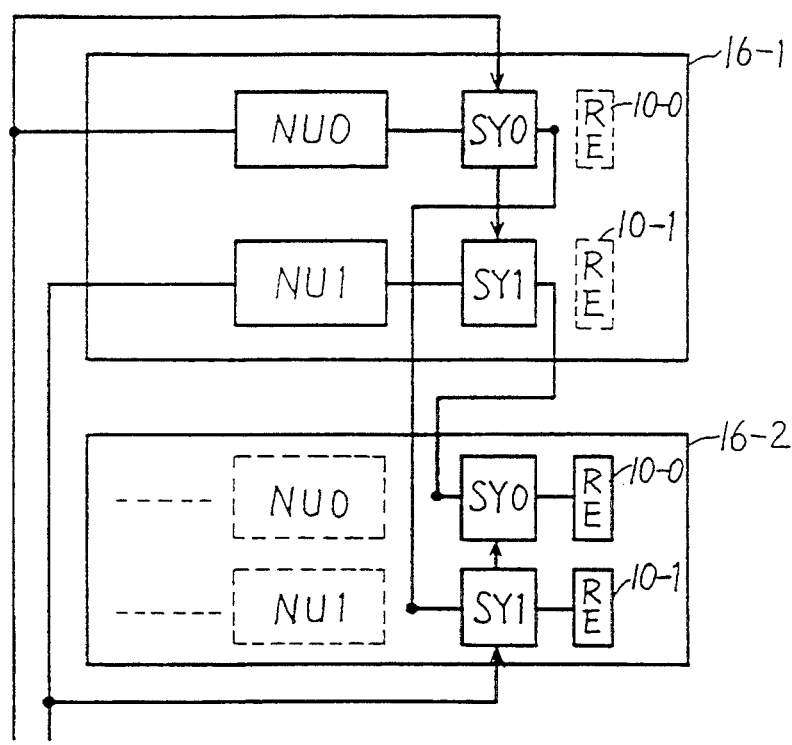
FIGS. 24A and 24B illustrate a chip-to-chip connection for forming a system using a plurality of parallel operational semiconductor integrated circuit devices according to the present invention.
Figure 24B:
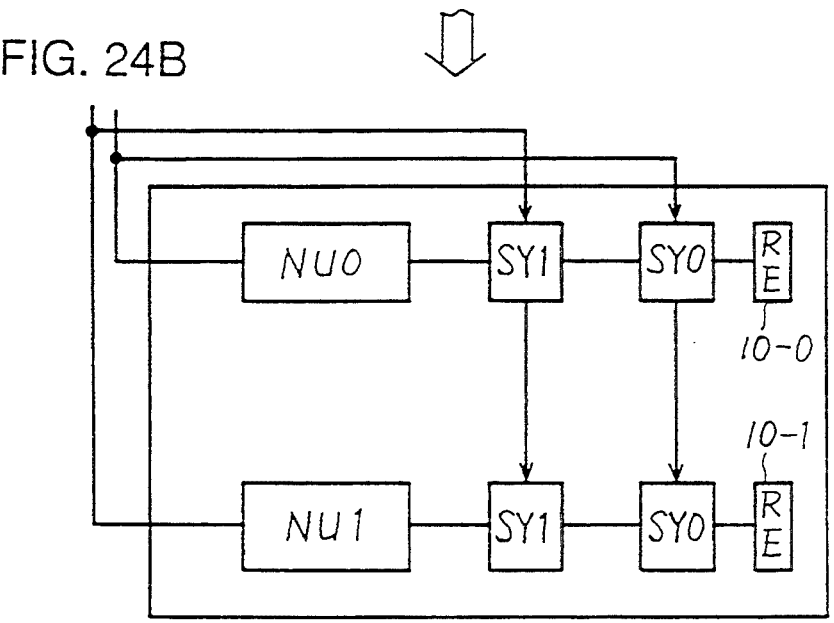

FIGS. 24A and 24B illustrate an exemplary connection structure of a multi-chip neural network. In these figures, each neurochip comprises two neuron units, each including a single synapse unit.

Referring to FIG. 24A, a neurochip 16-1 includes registers 10-0 and 10-1, synapse units SY0 and SY1, and neuron bodies NU0 and NU1. The neuron bodies NU0 and NU1 may or may not include accumulators. The neuron bodies NU0 and NU1 each may include at least a nonlinear processor. Another neurochip 16-2 is similar in structure to the neurochip 16-1. In this case, the output (output of an accumulator 3 or that of a precedent stage thereof) of a synapse unit SY-0 provided in the neurochip 16-2 is coupled to an input of the synapse unit SY1 provided in the neurochip 16-1, while the output of a synapse unit SY1 provided in the neurochip 16-2 is connected to an input of the synapse unit SY-0 provided in the neurochip 16-1. In the neurochip 16-1, the synapse units SY0 and SY1 are isolated from the registers 10-0 and 10-1 respectively. In the neurochip 16-2, on the other hand, the outputs of the synapse units SY0 and SY1 are cut off from corresponding neuron bodies NU0 and NU1.

The outputs (outputs of the nonlinear processors) of the neuron bodies NU0 and NU1 provided in the neurochip 16-1 are fed back to the synapse units SY0 and SY1 of the neurochips 16-1 and 16-2 respectively.

The connection structure shown in FIG. 24B is obtained in the aforementioned manner. Namely, a neural network includes two neuron units and each neuron unit includes two synapse units SY0 and SY1, while the outputs of the neuron units are fed back to the synapse units SY0 and SY1. Also in such a connection structure, the #neuron can be equated with the #synapse in the multi-chip neural network as a whole, whereby it is possible to construct a neural network which can efficiently execute parallel operational processing.

Figure 25:
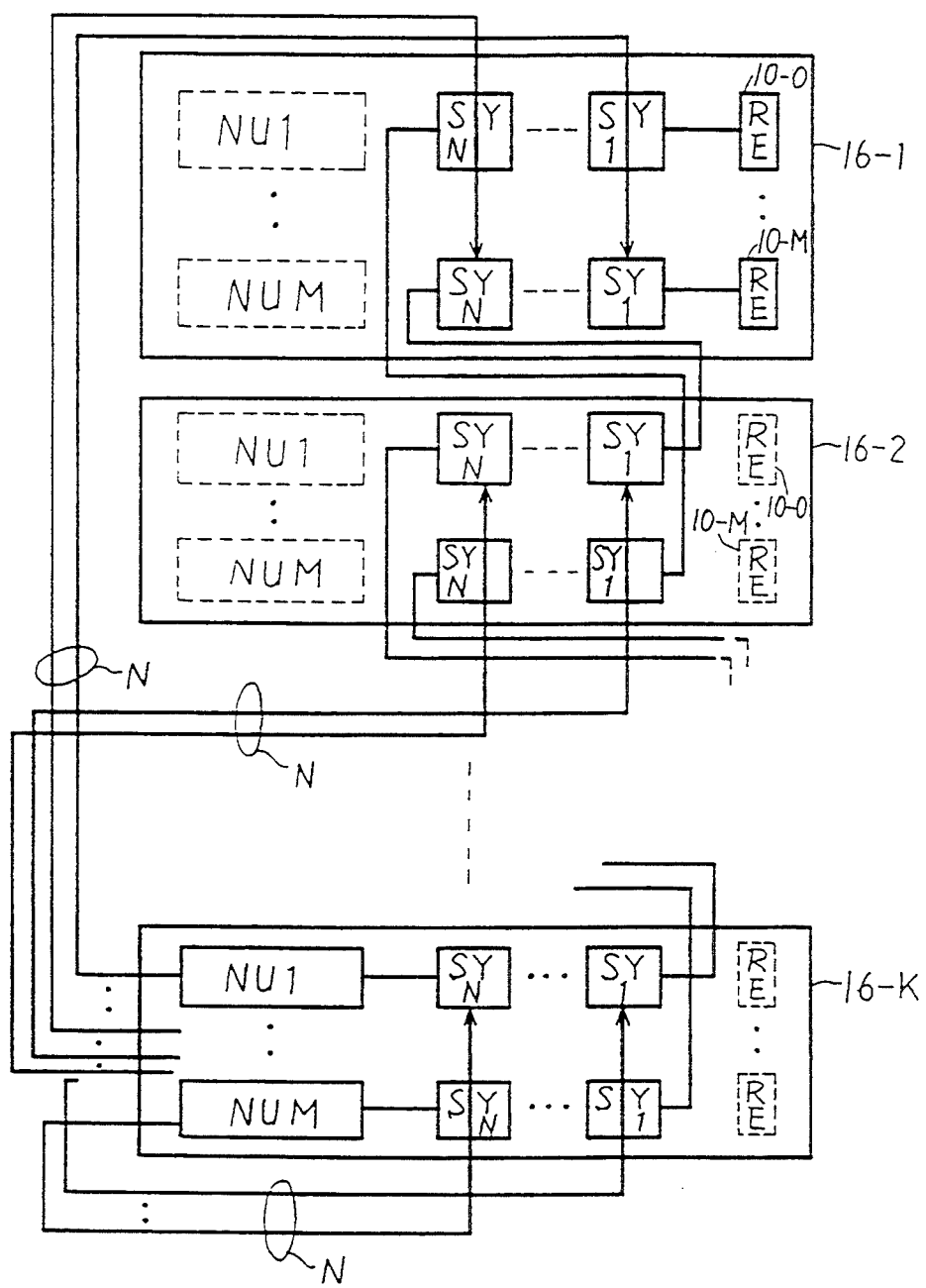
FIG. 25 illustrates a general expansion of the chip connection shown in FIGS. 24A and 24B.

FIG. 25 shows a general structure of the connection shown in FIGS. 24A and 24B. Referring to FIG. 25, each of neurochips 16-1 to 16-K includes M neuron units. A single neuron unit of each neurochip 16 includes N stage synapse units SY1 to SYN. It is assumed here that #neuron/synapse=M/N=K.

In this case, the final stage synapse units SYN in the respective neuron units of the neurochips 16-1 to 16-K are connected to inputs of the first stage synapse units SY1 of adjacent neurochips provided on downstream sides. In the neurochips 16-2 to 16-K, the synapse units SY1 are isolated from corresponding registers 10-0 to 10-M. In the neurochip 16-K, the outputs (outputs of nonlinear processors) of neuron bodies NU1 to NUM are supplied to the synapse units of the respective neurochips with N outputs forming a single group. Thus constructed is a multi-chip neural network having M neuron units, with M synapse units per neuron unit.

When the #neuron is a multiple of the #synapse or vice versa as hereinabove described, it is possible to equalize the number of neuron outputs with that of synapse stages at the time of feeding back the outputs of the neuron units to the synapse units, thereby enabling simple chip connection in system construction.

Eighth Embodiment

Figure 26:
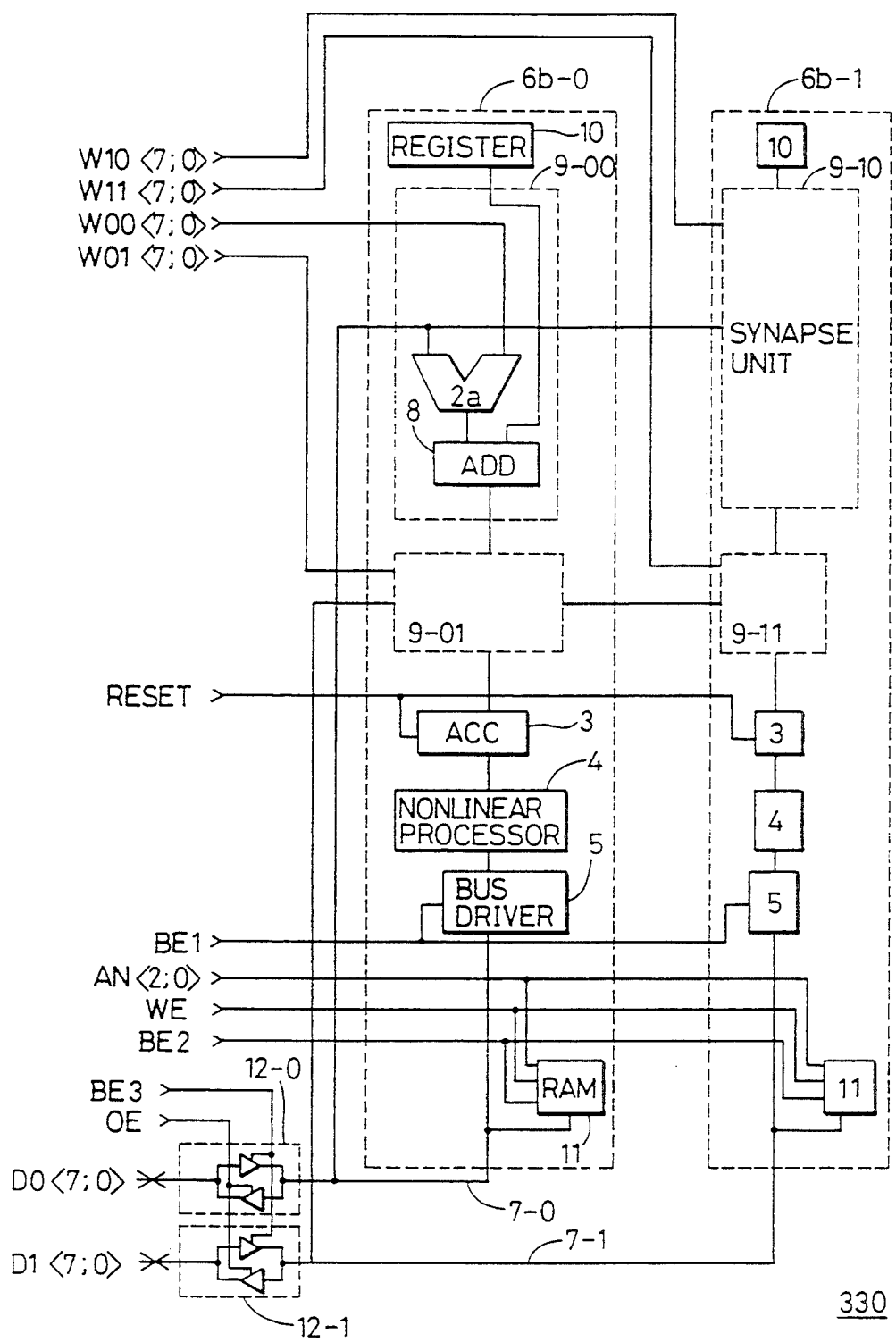
FIG. 26 illustrates an overall structure of a parallel operational semiconductor integrated circuit device according to an eighth embodiment of the present invention.

FIG. 26 illustrates an overall structure of a neurochip 330 according to an eighth embodiment of the present invention. Referring to FIG. 26, the neurochip 330 is similar in structure to that shown in FIG. 1 or 10, except that synapse units 9-00, 9-01, 9-10 and 9-11 include no weight memories 1.

The neurochip 330 receives synapse load values W10<7;0>, W11<7;0>, W00<7;0> and W01<7;0> from the exterior, in place of inclusion of such weight memories. The synapse load value W00<7;0> is supplied to one input of a binary operational circuit 2a of the synapse unit 900. The synapse load value W01<7;0> is supplied to one input of a binary operational circuit 2a of the synapse unit 9-01. The synapse load value W10<7:0> is supplied to one input of a binary operational circuit 2a of the synapse unit 9-10. The synapse load value W11<7;0> is supplied to a binary operational circuit 2a of the synapse unit 9-11. The binary operational circuits 2a may be replaced by other operational circuits such as multipliers.

Also in such a structure that the synapse load values are supplied from the exterior as described above, it is possible to attain an effect similar to those of the aforementioned embodiments. Particularly when the binary operational circuits 2a are formed by absolute differential value circuits, it is possible to correct synapse load values in accordance with an LVQ model, thereby easily constructing a neural network according to an LVQ model.

When weight memories 1 are contained, the memories may be formed by any of dynamic RAMs (random access memories), static RAMs, EEPROMs (electrically erasable/programmable read only memories), EPROMs (electrically programmable read only memories) and mask ROMs.

Ninth Embodiment

Figure 27:
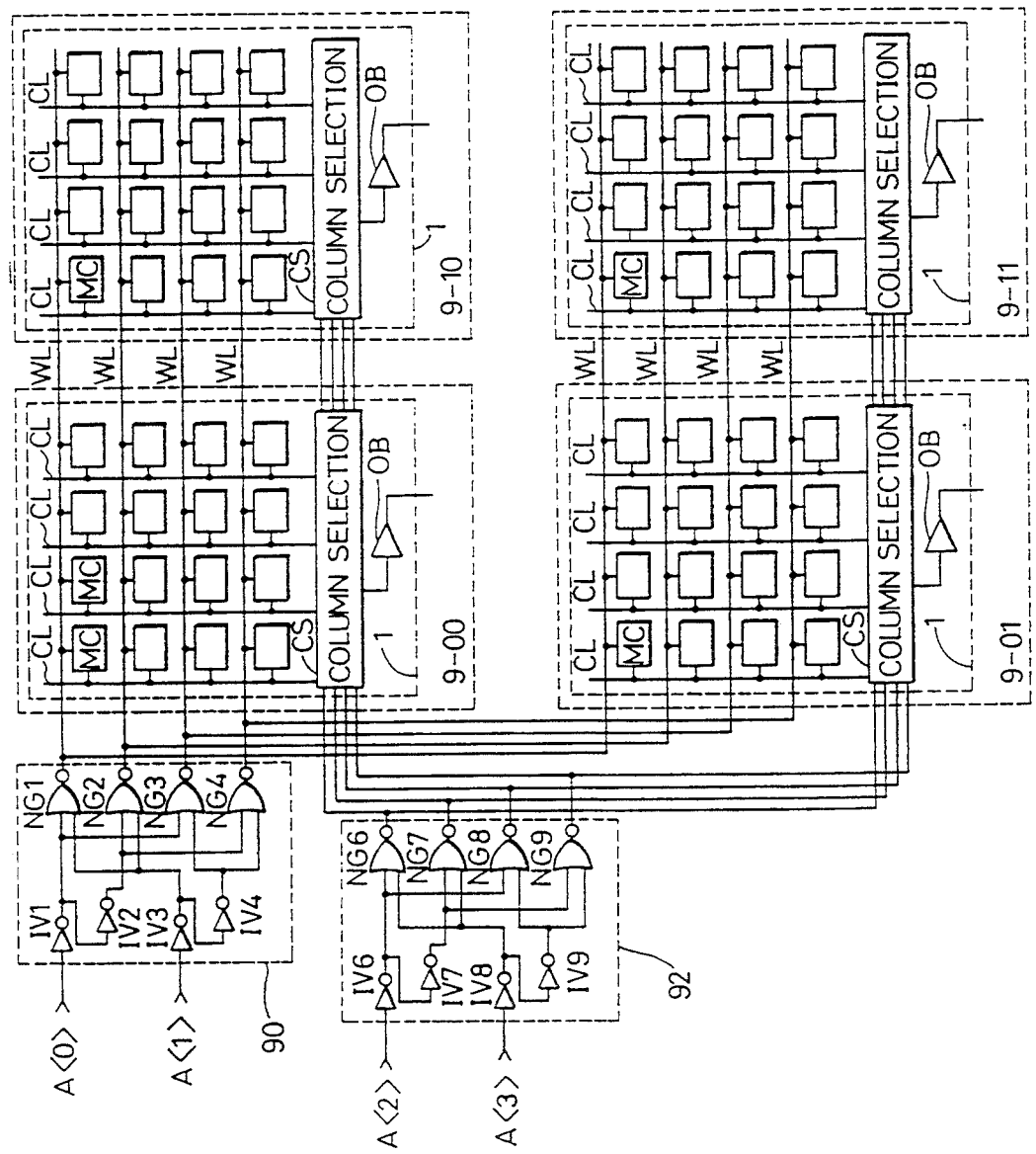
FIG. 27 illustrates a structure of a main part of a parallel operational semiconductor integrated circuit device according to a ninth embodiment of the present invention.
Figure 28:
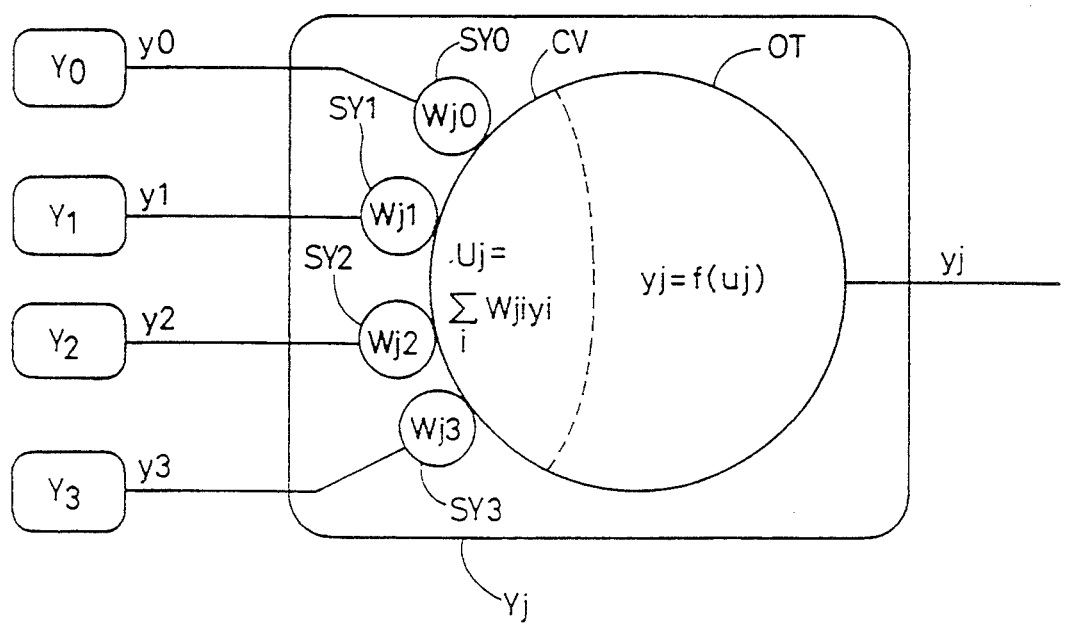
FIG. 28 illustrates a neuron model which is employed for a neural network.
Figure 29:
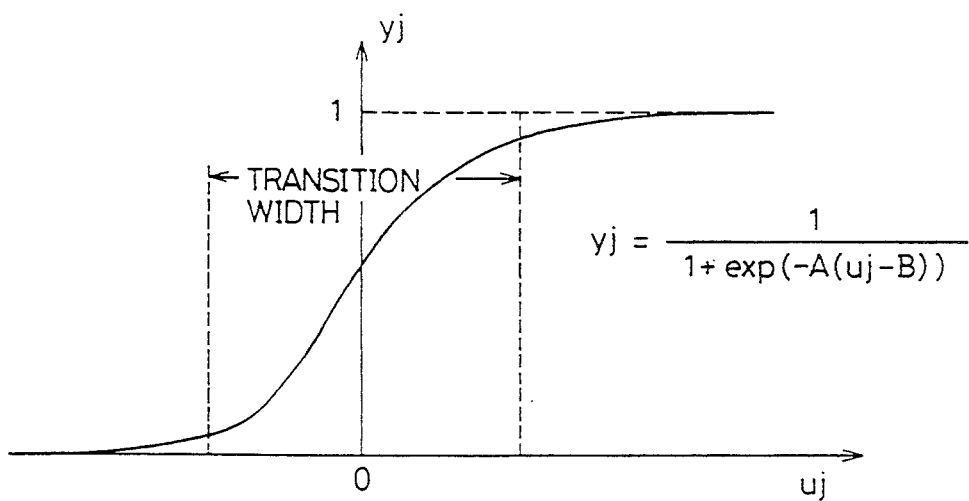
FIG. 29 illustrates an exemplary function which is employed for nonlinear conversion processing.
Figure 30:
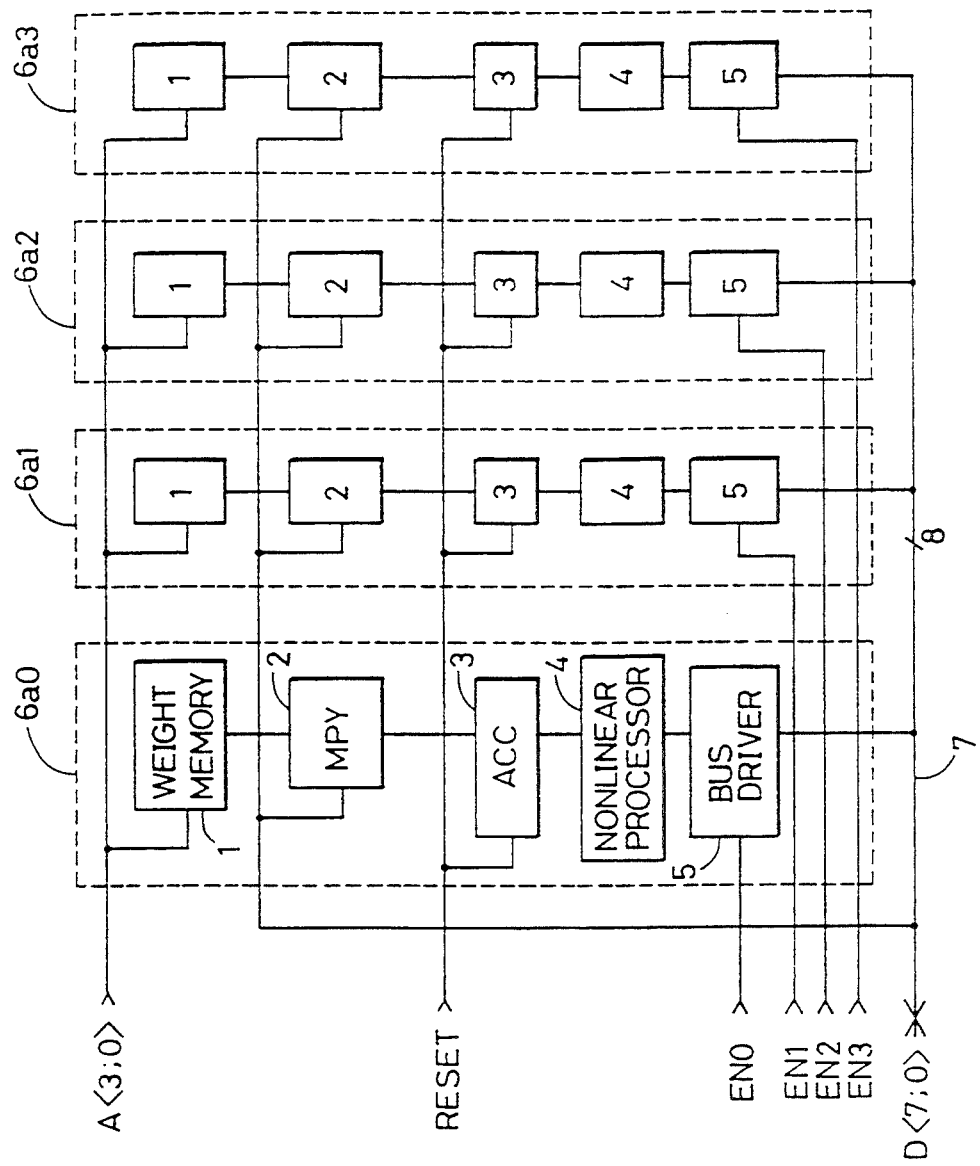
FIG. 30 illustrates an exemplary overall structure of a conventional neurochip.

FIG. 27 illustrates a structure of a main part of a neurochip according to a ninth-embodiment of the present invention. Referring to FIG. 27, four synapse units 9-00, 9-01, 9-10 and 9-11 each include weight memory 1 for storing associated synapse load values. Each of the weight memories 11 includes a plurality of memory cells MC which are arranged in the form of a matrix of rows and columns (the figure shows memory cells of 4 rows and 4 columns). Each weight memory 1 also includes word lines WL each connected with a row of memory cells MC and column lines CL each connected with a column of memory cells MC. The memory cells MC are arranged in correspondence to intersections of the word lines W1 and the column lines CL. Each memory 1 further includes a column selection gate CS for selecting a column and a read circuit OB for reading data on a column selected by the column selection gate CS.

The weight memories 1 of the respective synapse units 9-00, 9-01, 9-10 and 9-11 are supplied with an address A<3;0> in common, as clearly understood from the structure shown in FIG. 1. In the structure shown in FIG. 27, therefore, an address decoder for decoding the address A<3;0> is provided in common for the respective weight memories 1. This address decoder includes a row decoder 90 which decodes the address bits A<0> and A<1> for selecting a word line WL, and a column decoder 92 which decodes the address bits A<2> and A<3> and generates a column selection signal for supplying the same to the column selection gates CS. The row decoder 90 includes inverter circuits IV1 to IV4 and NOR circuits NG1 to NG4. This row decoder 90, which is a 2-to-4 decoder, selects one from the four word lines WL of each weight memory 1 by logic combination of the address bits A<0> and A<1>.

The column decoder 92 includes inverter circuits IV6 to IV9 and NOR circuits NG6 to NG9. This column decoder 92, which is also a 2-to-4 decoder, decodes the address bits A<2> and A<3> to generate signals for selecting corresponding columns in the memories 1.

Referring to FIG. 27, word line driving signal lines for the memories 1 are so arranged as to extend over the memories 1 of the horizontally adjacent synapse units. Column selection signal lines from the column decoder 92 are also provided in common for the synapse units 9-00, 9-01, 9-10 and 9-11, to extend along the memories 1 of the horizontally adjacent synapse units.

As hereinabove described, it is possible to reduce the occupied area of the chip and simplify the circuit structure and arrangement by providing the address decoder in common.

Such common provision of the address decoder is also applicable to an arrangement having a plurality of synapse units provided in a single neuron unit, and to an arrangement having a plurality of neuron units provided on a single neurochip. This can also be applied to an arrangement having a plurality of neuron units each having a single synapse unit. When there are a plurality of multipliers 2 or binary operational circuits 2a or 2b, weight memories are provided in correspondence thereto, whereby an address decoder can be provided in common for such weight memories.

Alternatively, such an address decoder may be provided in common for only rows or columns.

According to the present invention, as hereinabove described, each neuron unit is provided therein with first operational circuits for operating neuron state values and synapse load values and a plurality of second computing units receiving the results of operations of the first operational circuits, while the second computing units are laterally connected with each other in a single neuron unit. Due to this structure, it is possible to increase the degree of parallelism of processing with addition of a small number of circuit elements, thereby implementing an efficiently operating neural network which suppresses generation of idling neurons.

Due to a plurality of paths for inputting outputs of neuron units in synapse units, further, it is possible to transfer data between the neuron units at a high speed.

Principal effects of the present invention are as follows:

(1) Second operational means, which are adders, for example, are laterally connected so that nonlinear conversion processing is executed on the output of the final stage second operational means. Thus, it is possible to remarkably improve the degree of parallelism with addition of a small number of circuit elements. Since only the minimum number of required nonlinear conversion means are provided, it is possible to obtain a parallel Operational semiconductor integrated circuit device which can carry out efficient parallel operations.

(2) A plurality of first operational means for carrying out synapse operations, for example, are supplied with different data in a single processing unit, whereby it is possible to efficiently carry out parallel operations.

(3) Nonlinear conversion means carries out nonlinear operation processing on outputs of accumulation means, whereby it is possible to obtain a parallel operational semiconductor integrated circuit device which can efficiently simulate a neural network.

(4) First operational means are formed by multipliers, whereby synapse operations can be executed to obtain a parallel operational semiconductor integrated circuit device which can simulate a neural network.

(5) First operational means are formed by absolute differential circuits, whereby it is possible to obtain a parallel operational semiconductor integrated circuit device which can simulate a neural network according to an LVQ model.

(6) Second operational means are formed by adders so that the adders are laterally connected with each other, whereby it is possible to obtain a parallel operational semiconductor integrated circuit device which can express neuron units each having a plurality of synapse units.

(7) Second operational means are formed by compressors each having a number of outputs being reduced as compared with that of inputs, whereby it is possible to carry out additional operations at a high speed.

(8) Nonlinear conversion processing can be carried out at a high speed on a synapse sum calculated at a high speed, whereby it is possible to obtain a parallel operational semiconductor integrated circuit device which simulate a neural network at a high speed.

(9) Data are inputted and outputted in bit serial sequence, whereby it is possible to remarkably reduce the number of data input/output nodes thereby obtaining a parallel operational semiconductor integrated circuit device having a small chip area.

(10) Synapse units are divided into a plurality of groups, whereby it is possible to obtain a parallel operational semiconductor integrated circuit device which can carry out high-speed operational processing.

(11) Outputs of neuron units can be properly fed back to synapse units, whereby it is possible to obtain a parallel operational semiconductor integrated circuit device which can carry out high-speed operational processing with large data transfer bandwidths.

(12) Outputs of processing units are multiplexed and fed back to synapse units, whereby it is possible to obtain a parallel operational semiconductor integrated circuit device having a small chip area, which can efficiently carry out data transfer with optimum bandwidths.

(13) Outputs of chips can be fed back to synapse units thereof by external connection, whereby it is possible to implement an efficient multi-chip parallel operational processing system.

(14) At least a partial function of memory cell selection means is provided in common to a plurality of memories, whereby it is possible to implement neuron units having small chip occupied areas and having an arrangement in which the same units are regularly and repeatedly disposed, thereby obtaining a semiconductor integrated circuit device having a small chip occupied area which is excellent in design efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel operation semiconductor integrated circuit device comprising:
    a plurality of first operational means for carrying out a predetermined operation of first data and predetermined second data;
    a plurality of second operational means provided corresponding to said plurality of first operational means, each for receiving an output of a corresponding first operational means at a first input;
    first connection means for cascade connecting said plurality of second operational means with each other, said first connection means comprising means for connecting said plurality of second operational means in a lateral connection in which an output of an upstream second operational means is connected to a second input of a second operational means subsequent to said upstream second operational means in the cascade connection; and
    nonlinear conversion means for carrying out a nonlinear conversion processing on an output of a final second operational means in the cascade connection.

2. A parallel operational semiconductor integrated circuit device in accordance with claim 1, wherein each first operational means corresponding to respective second operational means receives different data as said first data.

3. A parallel operational semiconductor integrated circuit device in accordance with claim 1, wherein said nonlinear conversion means comprises:
    accumulation means for accumulating an output of said final second operational means, and
    nonlinear operational means for carrying out a predetermined nonlinear operational processing on the output of said accumulation means.

4. A parallel operational semiconductor integrated circuit device in accordance with claim 1, wherein each of said first operational means comprises digital multiplier for multiplying said first data by said second data.

5. A parallel operational semiconductor integrated circuit device in accordance with claim 1, wherein said first operational means comprises absolute differential value circuit for obtaining an absolute differential value of said first and second data.

6. A parallel operational semiconductor integrated circuit device in accordance with claim 1, wherein said second operational means comprises addition means for adding supplied data.

7. A parallel operational semiconductor integrated circuit device in accordance with claim 1, wherein each said second operational means comprises a plurality of full adders in parallel with each other, all outputs of said full adders are supplied to inputs of a subsequent second operational means.

8. A parallel operational semiconductor integrated circuit device in accordance with claim 7, wherein said nonlinear conversion means comprises:
    final addition means for adding outputs of said final second operational means,
    accumulation means for accumulating outputs of said final addition means, and nonlinear operational processing means for carrying out a nonlinear operational processing on an output of said accumulation means.

9. A parallel operational semiconductor integrated circuit device in accordance with claim 1, wherein said first data comprises a plurality of bits, and said first operational means successively receive said first data in a bit by bit serial sequence and said nonlinear conversion means parallelly outputs data of a plurality of bits in a bit parallel mode, and wherein said parallel operational semiconductor integrated circuit device further comprises:
shift means positioned between an output of said first operational means and an input of said nonlinear conversion means for shifting bits in position of supplied data, and
parallel-to-serial conversion means for converting a parallel output of said nonlinear conversion means to a bit serial output.

10. A parallel operational semiconductor integrated circuit device in accordance with claim 1, wherein said plurality of first and second operational means are divided into a plurality of groups said first connection means laterally connecting said plurality of second operational means in respective groups, and wherein said parallel operational semiconductor integrated circuit device further comprises a third operational means for receiving outputs of the final second operational means in each of said groups, carrying out the same operational processing as said second operational means on received data and supplying a result of said operational processing to said nonlinear conversion means.

11. A parallel operational semiconductor integrated circuit device comprising:
a plurality of processing units each comprising (a) a plurality of first operational means for carrying out a predetermined operation of a first data and a predetermined second data, (b) a plurality of second operational means each corresponding to an output of a respective one of said plurality of first operational means for carrying out predetermined operational processing on supplied data, (c) first connection means for connecting said plurality of second operational means in a lateral connection in which an output of a second operational means is connected to a second input of a subsequent second operational means, and (d) nonlinear conversion means for carrying out a nonlinear conversion processing on an output of a final second operational means in the lateral connection; and
second connection means for supplying outputs of said nonlinear conversion means in the respective processing units to the respective processing units in common as said first data, the number of said second connection means depending on the number of said nonlinear conversion means of said processing units and the number of said first operational means comprised in a single processing unit.

12. A parallel operational semiconductor integrated circuit device in accordance with claim 11, wherein numbers of said first and second operational means comprised in a single processing unit are identical to each other while the number of said processing units is N times the number of said second connection means, where said N represents a natural number, and wherein said parallel operational semiconductor integrated circuit device further comprises multiplexing means for multiplexingly coupling outputs of said nonlinear conversion means comprised in said N processing units with a single first operational means in respective processing units.

13. A parallel operational system comprising:
a plurality of semiconductor integrated circuits each being formed on a semiconductor chip and each comprising (a) first operational means for carrying out a predetermined operation of a first data and a predetermined second data, (b) second operational means provided in correspondence to said first operational means each for receiving an output of a corresponding first operational means at a first input thereof, (c) first connection means for connecting said second operational means in a lateral connection in which outputs of respective second operational means are coupled to respective second inputs of subsequent second operational means, and (d) nonlinear conversion means for carrying out a nonlinear conversion processing on an output of the finally connected second operational means in said lateral connection; and
second connection means for supplying outputs of said nonlinear conversion processing means provided in respective semiconductor integrated circuits in common to respective semiconductor integrated circuits as said first data, the number of said second connection means depending on the number of outputs of said nonlinear conversion means in a single semiconductor integrated circuit and the number of said first operational means included in a single semiconductor integrated circuit.

14. A system in accordance with claim 13, wherein a single of said semiconductor integrated circuits comprises N said nonlinear conversion means and M said first operational means per said nonlinear conversion means, with K said semiconductor integrated circuits being provided in parallel, where N, K and M represent integers satisfying a relation of N.K=M, and wherein said second connection means comprises means for transmitting all outputs of respective said nonlinear conversion means of respective said semiconductor integrated circuits to respective said first operational means in parallel.

15. A semiconductor integrated circuit device comprising:
a plurality of processing units each comprising (a) operational means for carrying out an operation of a first data and a predetermined second data, and (b) a memory comprising a plurality of memory cells for storing said second data; and
memory cell selection means having at least a part of selection function in common for said plurality of processing units for selecting memory cells from respective memories in accordance with an address signal.

* * * * *